(12) United States Patent
Tada et al.

(10) Patent No.: US 12,038,207 B2
(45) Date of Patent: Jul. 16, 2024

(54) REFRIGERATION CYCLE DEVICE

(71) Applicant: DENSO CORPORATION, Kariya (JP)

(72) Inventors: Kazuhiro Tada, Kariya (JP); Kengo Sugimura, Kariya (JP); Hiroyuki Kobayashi, Kariya (JP); Yuichi Kami, Kariya (JP); Satoshi Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 656 days.

(21) Appl. No.: 17/191,487

(22) Filed: Mar. 3, 2021

(65) Prior Publication Data

US 2021/0190389 A1 Jun. 24, 2021

Related U.S. Application Data

(63) Continuation of application No. PCT/JP2019/032752, filed on Aug. 22, 2019.

(30) Foreign Application Priority Data

Sep. 6, 2018 (JP) ................................. 2018-166947

(51) Int. Cl.
*F25B 13/00* (2006.01)
*F25B 41/20* (2021.01)

(52) U.S. Cl.
CPC .............. *F25B 13/00* (2013.01); *F25B 41/20* (2021.01)

(58) Field of Classification Search
CPC ........ F25B 41/22; F25B 25/005; F25B 41/20; B60K 11/02; B60H 1/22
See application file for complete search history.

(56) References Cited

U.S. PATENT DOCUMENTS

| 4,787,211 | A * | 11/1988 | Shaw | ................. | F25B 41/20 |
|---|---|---|---|---|---|
| | | | | | 417/248 |
| 10,589,594 | B2 * | 3/2020 | Heyl | ................. | B60L 3/0023 |
| 2010/0281901 | A1 * | 11/2010 | Kawase | ............ | B60H 1/32284 |
| | | | | | 62/238.7 |

(Continued)

FOREIGN PATENT DOCUMENTS

| DE | 102018102653 A1 | 8/2018 |
|---|---|---|
| DE | 102017218424 A1 | 4/2019 |

(Continued)

*Primary Examiner* — Frantz F Jules
*Assistant Examiner* — Martha Tadesse
(74) *Attorney, Agent, or Firm* — Harness, Dickey & Pierce, P.L.C.

(57) ABSTRACT

The refrigeration cycle device includes a compressor, an outside heat exchanger, a cooling pressure reducing unit, an evaporator, a branch portion, a cool down pressure reducing unit, a temperature adjusting unit, a merging portion, a bypass passage, and a first on-off valve. The temperature adjusting unit includes a temperature adjusting heat exchange unit and adjusts a temperature of a temperature adjustment target object. During a cooling and cool down mode, the outside heat exchanger functions as a radiator, and the evaporator and the temperature adjusting heat exchange unit function as heat absorbers. During a target object warm up mode, the refrigerant discharged from the compressor is guided to the temperature adjusting heat exchange unit via the bypass passage, and the heat of the discharged refrigerant is used as a heat source for heating the temperature adjustment target object.

6 Claims, 4 Drawing Sheets

(56) References Cited

U.S. PATENT DOCUMENTS

| | | |
|---|---|---|
| 2012/0085114 A1 | 4/2012 | Graaf et al. |
| 2012/0255319 A1 | 10/2012 | Itoh et al. |
| 2015/0121939 A1* | 5/2015 | Takeuchi ................ F25B 13/00 |
| | | 62/324.6 |
| 2015/0159933 A1 | 6/2015 | Itoh et al. |
| 2015/0217623 A1 | 8/2015 | Hatakeyama et al. |
| 2015/0338173 A1* | 11/2015 | Katoh ....................... F28F 1/12 |
| | | 165/172 |
| 2016/0109163 A1* | 4/2016 | Enomoto ................ F25B 13/00 |
| | | 62/160 |
| 2018/0222286 A1* | 8/2018 | Blatchley ............ H01M 10/625 |
| 2020/0269654 A1 | 8/2020 | Schroeder et al. |

FOREIGN PATENT DOCUMENTS

| | | |
|---|---|---|
| JP | 2012081955 A | 4/2012 |
| JP | 2014037180 A | 2/2014 |
| JP | 5929372 B2 | 6/2016 |
| JP | 5974960 B2 | 8/2016 |
| WO | WO-2013039047 A1 | 3/2013 |

\* cited by examiner

SOLE WARM UP MODE

HEATING AND WARM UP MODE

FIRST HEATING AND COOL DOWN MODE
(COOL DOWN PRIORITY MODE)

FIRST HEATING AND COOL DOWN MODE
(HEATING PRIORITY MODE)

REFRIGERATION CYCLE DEVICE

CROSS REFERENCE TO RELATED APPLICATIONS

The present application is a continuation application of International Patent Application No. PCT/JP2019/032752 filed on Aug. 22, 2019, which designated the U.S. and claims the benefit of priority from Japanese Patent Application No. 2018-166947 filed on Sep. 6, 2018, the contents of which are incorporated herein by reference.

TECHNICAL FIELD

The present disclosure relates to a refrigeration cycle device applied to an air conditioner.

BACKGROUND

Refrigeration cycle devices, such as those included in vehicle air conditioners, are generally configured to provide heating and cooling capabilities for an air conditioning target space such as a passenger compartment. In addition to this, such refrigeration cycle devices may also provide heating and cooling capabilities for additional devices, such as a battery disposed within a vehicle.

SUMMARY

In one aspect of the present disclosure, a refrigeration cycle device includes a compressor, an outside heat exchanger, a cooling pressure reducing unit, an evaporator, a branch portion, a cool down pressure reducing unit, a temperature adjusting unit, a merging portion, a bypass passage, and a first on-off valve. The temperature adjusting unit includes a temperature adjusting heat exchange unit and adjusts a temperature of a temperature adjustment target object. During a cooling and cool down mode, the outside heat exchanger functions as a radiator, and the evaporator and the temperature adjusting heat exchange unit function as heat absorbers. During a target object warm up mode, the refrigerant discharged from the compressor is guided to the temperature adjusting heat exchange unit via the bypass passage, and the heat of the discharged refrigerant is used as a heat source for heating the temperature adjustment target object.

BRIEF DESCRIPTION OF DRAWINGS

The above and other objects, features and advantages of the present disclosure will be more clearly understood from the following detailed description with reference to the accompanying drawings. In the accompanying drawings.

DETAILED DESCRIPTION

Hereinafter, multiple modes for carrying out the present disclosure will be described with reference to the drawings. In the respective embodiments, parts corresponding to matters already described in the preceding embodiments are given reference numbers identical to reference numbers of the matters already described. The same description is therefore omitted depending on circumstances. In a case where only a part of the configuration is described in each embodiment, the other embodiments described above can be applied to the other part of the configuration. The present disclosure is not limited to combinations of embodiments which combine parts that are explicitly described as being combinable. As long as no problem is present, the various embodiments may be partially combined with each other even if not explicitly described.

Figure 1:
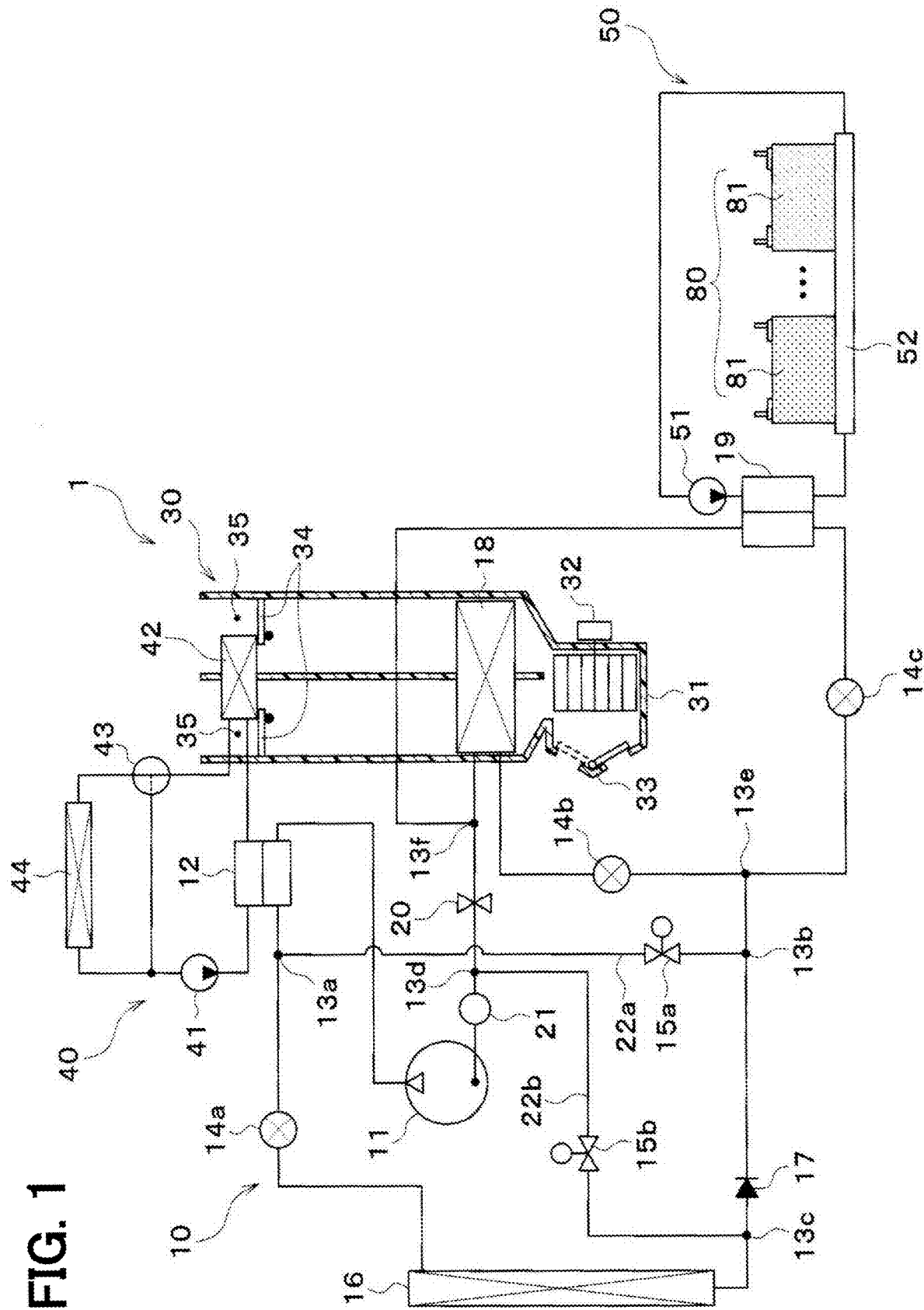
FIG. 1 is a schematic configuration diagram of a vehicle air conditioner according to an embodiment.

The embodiments in the present disclosure will be described with reference to FIGS. 1 to 6. FIG. 1 is a schematic configuration diagram of a vehicle air conditioner 1 according to the present embodiment.

In the present embodiment, a refrigeration cycle device 10 according to the present disclosure is applied to a vehicle air conditioner 1 mounted on an electric vehicle that obtains a propulsion driving force from an electric motor. The vehicle air conditioner 1 has a function of air conditioning the vehicle compartment, which is the air conditioning target space, and also adjusting the temperature of a battery 80. Therefore, the vehicle air conditioner 1 can also be referred to as an air conditioner with a battery temperature adjusting function.

The battery 80 is a secondary battery that stores electric power supplied to vehicle mounted devices such as an electric motor. The battery 80 of this embodiment is a lithium ion battery. The battery 80 is formed by stacking a plurality of battery cells 81 and electrically connecting these battery cells 81 in series or in parallel. In other words, the battery 80 is a battery pack.

The output of this type of battery tends to decrease at low temperatures. In addition, this type of battery tends of deteriorate quickly at high temperatures. Therefore, the temperature of the battery needs to be maintained within an appropriate temperature range (for example, between 10° C. and 50° C. inclusively) in which the charge/discharge capacity of the battery can be fully utilized.

Therefore, in the vehicle air conditioner 1, the temperature of the battery 80 can be adjusted within an appropriate temperature range by the heating and cooling effects generated by the refrigeration cycle device 10. Therefore, the temperature adjustment target in the refrigeration cycle device 10 according to the present embodiment is the battery 80.

Further, in addition to normal air conditioning executed when an occupant is in the vehicle, the vehicle air conditioner 1 is configured to be capable of performing pre air conditioning that starts air conditioning the vehicle interior before an occupant enters into the vehicle.

As shown in FIG. 1, the vehicle air conditioner 1 includes a refrigeration cycle device 10, an inside air conditioner unit 30, a high temperature side heat medium circuit 40, a battery side heat medium circuit 50, etc.

First, the overall configuration of the refrigeration cycle device 10 according to the present embodiment will be described.

The refrigeration cycle device 10 heats or cools the ventilation air blown into the vehicle interior in order to air condition the vehicle interior. Further, the refrigeration cycle device 10 heats or cools the battery side heat medium circulating in the battery side heat medium circuit 50 in order to adjust the temperature of the battery 80.

The refrigeration cycle device 10 is configured to be able to switch between refrigerant circuits for various operation modes in order to perform air conditioning in the vehicle interior. For example, a refrigerant circuit for a cooling mode, a refrigerant circuit for a dehumidifying and heating mode, and a refrigerant circuit for a heating, etc. may be provided.

Further, when the refrigeration cycle device 10 is in an operation mode for air conditioning, the refrigeration cycle device 10 is configured to be capable to switching between an operation mode for cooling the battery 80, an operation mode for heating the battery 80, and an operation mode in which the temperature of the battery 80 is not actively adjusted.

Further, the refrigeration cycle device 10 uses an HFO based refrigerant (specifically, R1234yf) as a refrigerant, and provides a vapor compression type subcritical refrigeration cycle in which the pressure of a discharged refrigerant discharged from a compressor 11 does not exceed the critical pressure of the refrigerant. Further, the refrigerant contains refrigerating machine oil for lubricating the compressor 11. Some of the refrigerating machine oil circulates in the cycle with the refrigerant.

Among components of the refrigeration cycle device 10, the compressor 11 draws in, compresses, and discharges the refrigerant in the refrigeration cycle device 10. The compressor 11 is arranged on the front side of the vehicle compartment and is disposed within a drive device compartment that also accommodates an electric motor and the like. The compressor 11 is an electric compressor that uses an electric motor to rotationally drive a fixed capacity type compression mechanism having a fixed discharge capacity. The rotation speed (that is, refrigerant discharge capacity) of the compressor 11 is controlled by a control signal output from a controller 60 which will be described later.

The inlet side of the refrigerant passage of a water-refrigerant heat exchanger 12 is connected to the discharge port of the compressor 11. The water-refrigerant heat exchanger 12 includes a refrigerant passage that carries the high pressure refrigerant discharged from the compressor 11 and a water passage that carries the high temperature side heat medium circulating in the high temperature side heat medium circuit 40. The water-refrigerant heat exchanger 12 is a heat exchanger for heating. Specifically, the water-refrigerant heat exchanger 12 heats the high temperature side heat medium by exchanging heat between the high pressure refrigerant flowing through the refrigerant passage and the high temperature side heat medium flowing through the water passage.

The outlet side of the water-refrigerant heat exchanger 12 is connected to the inlet port side of a first three way joint 13a. The first three way joint 13a includes three inflow ports in fluid communication with each other. The first three way joint 13a may be formed by jointing a plurality of pipes, or formed by providing a plurality of refrigerant passages to a metal block or a resin brock.

Further, the refrigeration cycle device 10 includes a second three way joint 13b, a third three way joint 13c, a fourth three way joint 13d, a fifth three way joint 13e, and a sixth three way joint 13f, as will be described later. The basic configurations of the second three way joint 13b, third three way joint 13c, fourth three way joint 13d, fifth three way joint 13e, and sixth three way joint 13f are the same as that of the first three way joint 13a.

An inlet side of a heating expansion valve 14a is connected to one outlet of the first three way joint 13a. One of the inlets of the second three way joint 13b is connected to the other outlet of the first three way joint 13a via a bypass passage 22a. A dehumidifying on-off valve 15a is arranged in the bypass passage 22a.

The dehumidifying on-off valve 15a is arranged in the bypass passage 22a connecting the other outlet of the first three way joint 13a and the one inlet of the second three way joint 13b. The dehumidifying on-off valve 15a is a solenoid valve that opens and closes the refrigerant passage of the bypass passage 22a. The dehumidifying on-off valve 15a is an example of a "first on-off valve".

The dehumidifying on-off valve 15a can be replaced by other means as long as the refrigerant passage of the bypass passage 22a can be selectively opened and closed. For example, a three way valve may be arranged at the position of the first three way joint 13a to substitute the function of the dehumidifying on-off valve 15a.

Further, the refrigeration cycle device 10 includes a heating on-off valve 15b, as will be described later. The basic configuration of the heating on-off valve 15b is the same as that of the dehumidifying on-off valve 15a. The dehumidifying on-off valve 15a and the heating on-off valve 15b are configured to switch between refrigerant circuits corresponding to various operation modes by opening and closing refrigerant passages.

Therefore, the dehumidifying on-off valve 15a and the heating on-off valve 15b may be collectively referred to as a refrigerant circuit switching device for switching refrigerant circuits in the refrigeration cycle system. The operation of the dehumidifying on-off valve 15a and the heating on-off valve 15b is controlled by a control voltage output from the controller 60.

The heating expansion valve 14a is a pressure reduction unit for heating. In particular, during an operation mode for heating at least the vehicle compartment, the heating expansion valve 14a is configured to reduce the pressure of the high pressure refrigerant flowing out of the refrigerant passage of the water-refrigerant heat exchanger 12, and to adjust a flow amount (mass flow rate) of the refrigerant flowing out to the downstream side. The heating expansion valve 14a is an electrical type variable throttle mechanism that includes a valve element configured to vary a throttle level and an electric actuator configured to vary the opening degree of the valve element.

Further, the refrigeration cycle device 10 includes a cooling expansion valve 14b and a cool down expansion valve 14c, as will be described later. The basic configurations of the cooling expansion valve 14b and the cool down expansion valve 14c are the same as that of the heating expansion valve 14a.

The heating expansion valve 14a, the cooling expansion valve 14b, and the cool down expansion valve 14c each have a fully open function and a fully closed function. The fully open function is equivalent to simply being a refrigerant passage without exerting a flow rate adjusting effect or refrigerant pressure reduction effect, i.e., by fully opening the valve opening degree. The fully closed function closes the refrigerant passage by fully closing the valve opening degree.

With the fully open function and the fully closed function, the heating expansion valve 14a, the cooling expansion valve 14b, and the cool down expansion valve 14c are capable of switching between refrigerant circuits corresponding to each operation mode. Therefore, the heating expansion valve 14a, the cooling expansion valve 14b, and the cool down expansion valve 14c according to the present embodiment also function as a refrigerant circuit switching device.

The operation of the heating expansion valve 14a, the cooling expansion valve 14b, and the cool down expansion valve 14c is controlled by a control signal (control pulse) output from the controller 60.

A refrigerant inlet side of an outside heat exchanger 16 is connected to an outlet of the heating expansion valve 14a. The outside heat exchanger 16 is a heat exchanger for exchanging heat between the refrigerant flowing out from the heating expansion valve 14a and outside air blown by a cooling fan (not shown).

The outside heat exchanger 16 is arranged on the front side within a drive device compartment. Therefore, when the vehicle is travelling, the intake air from the wind can be applied to the outside heat exchanger 16. Further, the outside heat exchanger 16 exchanges heat between the refrigerant flowing inside the outside heat exchanger 16 and the outside air introduced as intake air from the wind or the like. Here, the outside air passing through the outside heat exchanger 16 cannot be completely blocked from flowing.

An inlet of the third three way joint 13c is connected to the refrigerant outlet of the outside heat exchanger 16. One inlet of the fourth three way joint 13d is connected to one outlet of the third three way joint 13c via a heating passage 22b.

The heating on-off valve 15b for opening and closing the refrigerant passage is arranged in the heating passage 22b. The heating on-off valve 15b is composed of a solenoid valve. The heating on-off valve 15b is an example of a "second on-off valve".

The heating on-off valve 15b can be replaced by other means as long as the refrigerant passage of the heating passage 22b can be selectively opened and closed. For example, a three way valve may be arranged at the position of the third three way joint 13c to substitute the function of the heating on-off valve 15b.

Another inlet of the second three way joint 13b is connected to another outlet of the third three way joint 13c. A check valve 17 is disposed in the refrigerant passage connecting the other outlet of the third three way joint 13c and the other inlet of the second three way joint 13b. The check valve 17 allows refrigerant to flow from the third three way joint 13c to the second three way joint 13b, and prevents refrigerant from flowing from the second three way joint 13b to the third three way joint 13c.

An inlet of the fifth three way joint 13e is connected to an outlet of the second three way joint 13b. An inlet of the cooling expansion valve 14b is connected to one outlet of the fifth three way joint 13e. Further, an inlet of the cool down expansion valve 14c is connected to the other outlet of the fifth three way joint 13e.

The cooling expansion valve 14b is a pressure reduction unit for cooling. In particular, during an operation mode for cooling at least the vehicle compartment, the cooling expansion valve 14b is configured to reduce the pressure of the refrigerant that has passed through the second three way joint 13b and to adjust the flow rate of the refrigerant flowing out to the downstream side.

A refrigerant inlet side of the inside evaporator 18 is connected to an outlet side of the cooling expansion valve 14b. The inside evaporator 18 is disposed in the air conditioning case 31 of the inside air conditioning unit 30 described later. The inside evaporator 18 is a cooling heat exchanger configured to cool ventilation air by exchanging heat between the low pressure refrigerant pressure reduced by the cooling expansion valve 14b and the ventilation air supplied from the blower 32 to cause the low pressure refrigerant to evaporate. As a result, the low pressure refrigerant absorbs heat through evaporation. The inside evaporator 18 functions as an evaporator. Another inlet of the sixth three way joint 13f is connected to a refrigerant outlet of the inside evaporator 18.

The cool down expansion valve 14c is a pressure reduction unit for cooling. During at least an operation mode for cooling the battery 80, the cool down expansion valve 14c is configured to reduce the pressure of the refrigerant that has passed through the second three way joint 13b and to adjust the flow rate of the refrigerant that flows out to the downstream side.

The inlet side of the refrigerant passage of the chiller 19 is connected to the outlet of the cool down expansion valve 14c. The chiller 19 has a refrigerant passage for circulating the low pressure refrigerant pressure reduced by the cool down expansion valve 14c and a water passage for circulating the battery side heat medium circulating in the battery side heat medium circuit 50 described later.

The chiller 19 is a temperature adjusting heat exchange unit that adjusts the temperature of the battery side heat medium by exchanging heat between the refrigerant flowing through the refrigerant passage and the battery side heat medium flowing through the water passage. Therefore, the chiller 19 corresponds to a temperature adjusting heat exchange unit. Another inlet of the sixth three way joint 13f is connected to an outlet of the refrigerant passage of the chiller 19.

An inlet of the evaporation pressure adjusting valve 20 is connected to an outlet of the sixth three way joint 13f. The evaporation pressure adjusting valve 20 keeps a refrigerant evaporating pressure in the inside evaporator 18 above or at a predetermined reference pressure in order to prevent frost formation on the inside evaporator 18. The evaporation pressure adjusting valve 20 is configured with a mechanical variable orifice mechanism that increases a degree of valve opening as a pressure of the refrigerant on the outlet side of the inside evaporator 18 increases.

As a result, the evaporation pressure adjusting valve 20 maintains the refrigerant evaporation temperature in the inside evaporator 18 at or above the frost suppression temperature (for example, 1° C.) capable of suppressing frost formation on the inside evaporator 18. Further, the evaporation pressure adjusting valve 20 is arranged on a downstream side of the sixth three way joint 13f, which is a merging portion. Therefore, the evaporation pressure adjusting valve 20 also maintains the refrigerant evaporation temperature in the chiller 19 at the frost formation suppression temperature or higher.

Another inlet of the fourth three way joint 13d is connected to an outlet of the evaporation pressure adjusting valve 20. An inlet side of the accumulator 21 is connected to an outlet of the fourth three way joint 13d. The accumulator 21 is a gas liquid separator that separates gas and liquid of the refrigerant flowing into the accumulator 21 and stores therein surplus liquid phase refrigerant of the cycle. A gas phase refrigerant outlet of the accumulator 21 is connected to a suction port side of the compressor 11.

As is clear from the above description, the fifth three way joint 13e functions as a branch portion that branches the refrigerant flow that has flowed out of the outside heat exchanger 16. Further, the sixth three way joint 13f function as a merging portion, which merges a refrigerant flow flowing out of the inside evaporator 18 with the refrigerant flow flowing out of the chiller 19 and discharges the merged flow to a suction side of the compressor 11.

The inside evaporator 18 and the chiller 19 are connected to each other in parallel with respect to the refrigerant flow. Further, the heating passage 22b guides the refrigerant flowing out from the outside heat exchanger 16 to the suction port side of the compressor 11 by bypassing the inside evaporator 18 and the chiller 19, and functions as a heating passage. The heating on-off valve 15b functions as an on-off valve for opening and closing the refrigerant passage of the heating passage 22b.

Next, the high temperature side heat medium circuit 40 will be described. The high temperature side heat medium circuit 40 is a heat medium circulation circuit for circulating the high temperature side heat medium. As the high temperature side heat medium, ethylene glycol, dimethylpolysiloxane, a solution including a nano fluid or the like, an antifreeze liquid or the like can be adopted. In the high temperature side heat medium circuit 40, a water passage of a water-refrigerant heat exchanger 12, a high temperature side heat medium pump 41, and a heater core 42, etc. are arranged.

The high temperature side heat medium pump 41 is a water pump that pumps the high temperature side heat medium to the inlet side of the water passage of the water-refrigerant heat exchanger 12. The high temperature side heat medium pump 41 is an electric pump in which a rotation speed (that is, a pumping capacity) is controlled by a control voltage output from the controller 60.

Further, a heat medium inlet side of the heater core 42 is connected to an outlet of the water passage of the water-refrigerant heat exchanger 12. The heater core 42 is a heat exchanger to heat the blown air by performing heat exchange between the high temperature side heat medium heated by the water-refrigerant heat exchanger 12 and the blown air passed through the inside evaporator 18. The heater core 42 is arranged in the air conditioning case 31 of the inside air conditioning unit 30.

The inlet side of a high temperature side three way valve 43 is connected to the heat medium outlet of the heater core 42. The three way valve 53 is an electric three way variable flow rate valve that has one inlet and two outlets, and is configured to continuously adjust the passage area ratio between the two outlets. Operation of the high temperature side three way valve 23 is controlled in accordance with a control signal output from the controller 60.

The heat medium inlet side of the high temperature side radiator 44 is connected to one outlet of the high temperature side three way valve 43. The suction port side of the high temperature side heat medium pump 41 is connected to the other outlet of the high temperature side three way valve 43. Therefore, the high temperature side three way valve 43 is configured to adjust the flow rate ratio between the flow rate of the high temperature side heat medium flowing out from the heater core 42 and into the high temperature side radiator 44, and the flow rate of the high temperature side heat medium flowing out form the heater core 42 that bypasses the high temperature side radiator 44 to be sucked into the high temperature side heat medium pump 41.

The high temperature side radiator 44 is a heat exchanger that exchanges heat between the high temperature side heat medium flowing out from the heater core 42 and outside air blown by an outside air fan (not shown) to dissipate the heat of the high temperature side heat medium to outside air.

The low temperature side radiator 54 is arranged on the front side within the drive device compartment. Therefore, when the vehicle is in motion, wind generated from the movement of the vehicle can be applied to the high temperature side radiator 44. The suction port side of the high temperature side heat medium pump 41 is connected to the heat medium outlet of the high temperature side radiator 44.

Therefore, in the high temperature side heat medium circuit 40, the controller 60 is configured to operate the high temperature side heat medium pump 41 to exchange heat between the refrigerant discharged from the compressor 11 and the high temperature side heat medium in the water-refrigerant heat exchanger 12, thereby heating the high temperature side heat medium. Further, in the heater core 42, ventilation air can be heated by exchanging heat between the high temperature side heat medium heated by the water-refrigerant heat exchanger 12 and the ventilation air.

That is, in the present embodiment, each of the components of the water-refrigerant heat exchanger 12 and the high temperature side heat medium circuit 40 constitutes a heating unit for heating ventilation air using the refrigerant discharged from the compressor 11 as a heat source.

Next, the battery side heat medium circuit 50 will be described. The battery side heat medium circuit 50 is a heat medium circuit that circulates a battery side heat medium. As the battery side heat medium, the same fluid as the high temperature side heat medium can be adopted. In the battery side heat medium circuit 50, a water passage of the chiller 19, a battery side heat medium pump 51, a heat exchange unit 52, and the like are arranged.

The battery side heat medium pump 51 is a water pump that pumps the battery side heat medium to the inlet side of the water passage in the chiller 19. The basic configuration of the battery side heat medium pump 51 is the same as that of the high temperature side heat medium pump 41.

The inlet side of the heat exchange unit 52 is connected to the outlet of the water passage of the chiller 19. The heat exchange unit 52 has a plurality of heat medium flow paths formed by metal plates arranged so as to come into contact with the plurality of battery cells 81 forming the battery 80. The heat exchange unit 52 is configured to adjust the temperature of the battery 80 by exchanging heat between the battery side heat medium flowing through the heat medium flow path and the battery cells 81.

The heat exchange unit 52 may be arranged to provide a heat medium flow path between the stacked battery cells 81. Alternatively, the heat exchange unit 52 may be integrally formed with the battery 80. For example, the heat exchange unit 52 may be integrally formed with the battery 80 by arranging the heat medium passage in a dedicated case for accommodating the stacked battery cells 81. The suction port side of the battery side heat medium pump 51 is connected to the outlet of the heat exchange unit 52.

Therefore, in the battery side heat medium circuit 50, the controller 60 is configured to operate the battery side heat medium pump 51 to exchange heat between the refrigerant flowing out of the cool down expansion valve 14c and the battery side heat medium in the chiller 19, thereby adjusting temperature of the battery side heat medium. Further, in the heat exchange unit 52, the temperature of the battery 80 can be adjusted by exchanging heat between the temperature adjusted battery side heat medium and the battery 80.

That is, in the present embodiment, each component device of the chiller 19 and the battery side heat medium circuit 50 constitutes a temperature adjusting unit that adjusts the temperature of the battery 80 using the refrigerant flowing out from the cool down expansion valve 14c. Further, the battery side heat medium is a temperature adjusting side heat medium, and the battery side heat medium circuit 50 is a temperature adjusting side heat medium circuit that circulates the temperature adjusting side heat medium.

Next, the configuration of the inside air conditioning unit 30 will be described. The inside air conditioning unit 30 supplies ventilation air, which has been temperature adjusted by the refrigeration cycle device 10, to the vehicle compartment. The inside air conditioning unit 30 is disposed inside an instrument panel at the frontmost area of the vehicle compartment.

As shown in FIG. 1, the inside air conditioning unit 30 accommodates a blower 32, an inside evaporator 18, a heater core 42, and the like in an air passage formed in an air conditioning case 31. The air conditioning case forms the outer shell of the inside air conditioning unit.

The air conditioning case 31 forms an air passage for the ventilation air blown to the vehicle compartment. The air conditioning case 31 is formed of a resin (for example, polypropylene) having a certain degree of elasticity and also excellent in strength.

An inside outside air switch device 33 is disposed on the ventilation airflow most upstream side in the air conditioning case 31. The inside outside air switch device 33 switches and introduces inside air (air within the vehicle compartment) and outside air (air outside the vehicle compartment) into the air conditioning case 31.

The inside outside air switch device 33 continuously adjusts an opening area of an inside air introduction port through which the inside air is introduced into the air conditioning case 31 and an opening area of an outside air introduction port through which the outside air is introduced into the air conditioning case 31 by using an inside outside air switch door to change an introduction ratio between an introduction air volume of the inside air to an introduction air volume of the outside air. The inside outside air switch door is driven by an electric actuator for the inside outside air switch door. Operation of the electric actuator is controlled in accordance with a control signal output from the controller 60.

The blower 32 is disposed downstream of the inside outside air switch device 33 with respect to the ventilation airflow. The blower 32 blows air sucked through the inside outside air switch device 33 toward the inside of the vehicle compartment. The blower 32 is an electric blower in which a centrifugal multi blade fan is driven by an electric motor. A rotation speed (i.e., blowing capacity) of the blower 32 is controlled by a control voltage output from the controller 60.

The inside evaporator 18 and the heater core 42 are disposed in this order downstream of the blower 32 with respect to the ventilation airflow. That is, the inside evaporator 18 is disposed on the ventilation airflow upstream side of the heater core 42.

In the air conditioning case 31, a cool air bypass passage 35 is provided in which the ventilation air, having previously passed through the inside evaporator 18, is allowed to bypass the heater core 42. An air mix door 34 is disposed in the air conditioning case 31 on the ventilation airflow downstream side of the inside evaporator 18 and on the ventilation airflow upstream side of the heater core 42.

The air mix door 34 is an air volume ratio adjusting unit which controls an air volume ratio of a volume of the ventilation air passing through the heater core 42 to a volume of the ventilation air passing through the cold air bypass passage 35 after passing through the inside evaporator 18. The air mix door 34 is driven by an electric actuator for the air mix door. Operation of the electric actuator is controlled in accordance with a control signal output from the controller 60.

A mixing space is arranged on the ventilation airflow downstream side of the heater core 42 and the cold air bypass passage 35 in the air conditioning case 31. The mixing space is a space for mixing the ventilation air heated by the heater core 42 and the ventilation air that bypassed the heater core 42 by passing through the cold air bypass passage 35.

Opening holes for discharging the ventilation air (i.e., air conditioned air) mixed in the mixing space to the vehicle compartment, which is a space to be air conditioned, are disposed on the ventilation airflow downstream portion in the air conditioning case 31.

The opening holes include a face opening hole, a foot opening hole, and a defroster opening hole (not shown). The face opening hole is an opening hole for blowing the air conditioning wind toward an upper body of an occupant in the vehicle compartment. The foot opening hole is an opening hole through which the conditioned air is blown toward the feet of the occupant. The defroster opening hole is an opening hole for blowing the air conditioning wind toward an inner surface of a vehicle front window glass.

The face opening hole, the foot opening hole, and the defroster opening hole are respectively connected through ducts defining air passages to a face vent, a foot vent, and a defroster vent (not shown) provided in the vehicle compartment.

Therefore, the air mix door 34 adjusts an air volume ratio between an air volume passing through the heater core 42 and an air volume passing through the cold air bypass passage 35, thereby adjusting the temperature of the air conditioning wind mixed in the mixing space. As a result, the temperature of the ventilation air (air conditioned air) to be discharged into the vehicle compartment from each outlet port is adjusted.

Further, a face door, a foot door, and a defroster door (none of which are shown) are arranged on the ventilation airflow upstream side of the face opening hole, the foot opening hole, and the defroster opening hole, respectively. The face door adjusts an opening area of the face opening hole. The foot door adjusts an opening area of the foot opening hole. The defroster door adjusts an opening area of the defroster opening hole.

The face door, the foot door, and the defroster door form a vent mode switching door for switching vent modes. These doors are connected to an electric actuator for driving a vent mode door through a link mechanism or the like, and are rotationally operated in conjunction with the actuator. Operation of the electric actuator is also controlled in accordance with a control signal output from the control unit 60.

The outlet modes that are switched by an outlet mode switching device specifically includes a face mode, a bi level mode, a foot mode, and the like.

The face mode is an outlet mode in which the face outlet port is fully opened to blow out air from the face outlet port toward an upper body of an occupant in the vehicle compartment. The bi level mode is an outlet mode in which both the face outlet port and the foot outlet port are opened to blow out air toward the upper body and the foot of the occupant in the vehicle compartment. The foot mode is a vent mode in which the foot vent is fully opened and the defroster vent is opened slightly so that the air is blown mainly from the foot vent.

Further, the occupant can manually switch the outlet mode switching switch provided on the operation panel 70 to switch to the defroster mode. The defroster mode is an outlet mode in which the defroster outlet port is fully opened so that air is blown toward an inner face of the front windshield through the defroster outlet port.

Next, a control system of the vehicle air conditioner 1 will be described with reference to FIG. 2. The vehicle air conditioner 1 includes the controller 60 for controlling operations of constituent devices. The controller 60 includes a typical microprocessor including a CPU, a ROM, a RAM, and the like, and peripheral circuits of the microprocessor.

The controller 60 performs various calculations and processes based on control programs stored in the ROM, and controls the operation of various control target devices connected to an output side of the controller 60. The various control target devices include a compressor 11, a heating expansion valve 14a, a cooling expansion valve 14b, a cool down expansion valve 14c, a dehumidifying on-off valve 15a, a heating on-off valve 15b, a blower 32, a high temperature side heat medium pump 41, a high temperature side three way valve 43, a battery side heat medium pump 51, and the like.

Further, various sensors are connected to the input side of the controller 60, and the detection signals of the various sensors are input to the controller 60. As shown in FIG. 2, various sensors include an inside air temperature sensor 61, an outside air temperature sensor 62, a solar sensor 63, a first refrigerant temperature sensor 64a, a second refrigerant temperature sensor 64b, a third refrigerant temperature sensor 64c, a fourth refrigerant temperature sensor 64d, a fifth refrigerant temperature sensor 64e, a first refrigerant pressure sensor 65a, and a second refrigerant pressure sensor 65b. Further, various sensors include an evaporator temperature sensor 66, a high temperature side heat medium temperature sensor 67a, a battery side heat medium temperature sensor 67b, a battery temperature sensor 68, an air conditioning air temperature sensor 69, and the like.

The inside air temperature sensor 61 is an inside air temperature detector that detects a temperature within the vehicle compartment (inside air temperature) Tr. The outside air temperature sensor 62 is an outside air temperature detector that detects a temperature outside the vehicle compartment (outside air temperature) Tam. The solar sensor 63 is a solar radiation amount detector that detects a solar radiation amount Ts radiated into the vehicle compartment.

The first refrigerant temperature sensor 64a is a discharge refrigerant temperature detection unit that detects a temperature T1 of the discharge refrigerant discharged from the compressor 11. The second refrigerant temperature sensor 64b is a second refrigerant temperature detection unit that detects a temperature T2 of the refrigerant that has flowed out of the refrigerant passage of the water-refrigerant heat exchanger 12. The third refrigerant temperature sensor 64c is a third refrigerant temperature detection unit that detects a temperature T3 of the refrigerant that has flowed out of the outside heat exchanger 16.

The fourth refrigerant temperature sensor 64d is a fourth refrigerant temperature detection unit that detects a temperature T4 of the refrigerant that has flowed out of the inside evaporator 18. The fifth refrigerant temperature sensor 64e is a fifth refrigerant temperature detection unit that detects a temperature T5 of the refrigerant flowing out from the refrigerant passage of the chiller 19.

The first refrigerant pressure sensor 65a is a first refrigerant pressure detection unit that detects a pressure P1 of the refrigerant flowing out of the refrigerant passage of the water-refrigerant heat exchanger 12. The second refrigerant pressure sensor 65b is a second refrigerant pressure detection unit that detects a pressure P2 of the refrigerant flowing out from the refrigerant passage of the chiller 19.

The evaporator temperature sensor 66 is an evaporator temperature detector that detects a refrigerant evaporation temperature (evaporator temperature) Tefin in the inside evaporator 18. The evaporator temperature sensor 66 specifically detects a heat exchange fin temperature of the inside evaporator 18.

The high temperature side heat medium temperature sensor 67a is a high temperature side heat medium temperature detection unit that detects the high temperature side heat medium temperature TWH, which is a temperature of the high temperature side heat medium flowing out from the water passage of the water-refrigerant heat exchanger 12 and flowing into the heater core 42.

The battery side heat medium temperature sensor 67b is a battery side heat medium temperature detection unit that detects the battery side heat medium temperature TWC, which is the temperature of the battery side heat medium flowing out of the water passage of the chiller 19 and flowing into the heat exchange unit 52.

The battery temperature sensor 68 is a battery temperature detection unit that detects a battery temperature TB (that is, the temperature of the battery 80). The battery temperature sensor 68 is configured to have a plurality of detection units, and detects the temperature of a plurality of locations of the battery 80. Therefore, the controller 60 can also detect the temperature differences of each unit of the battery 80. Further, as the battery temperature TB, the average value of the detection values of the plurality of detection units may be used.

The conditioned air temperature sensor 69 is a conditioned air temperature detector that detects a ventilation air temperature TAV of the ventilation air blown from the mixing space into the vehicle compartment.

Figure 2:
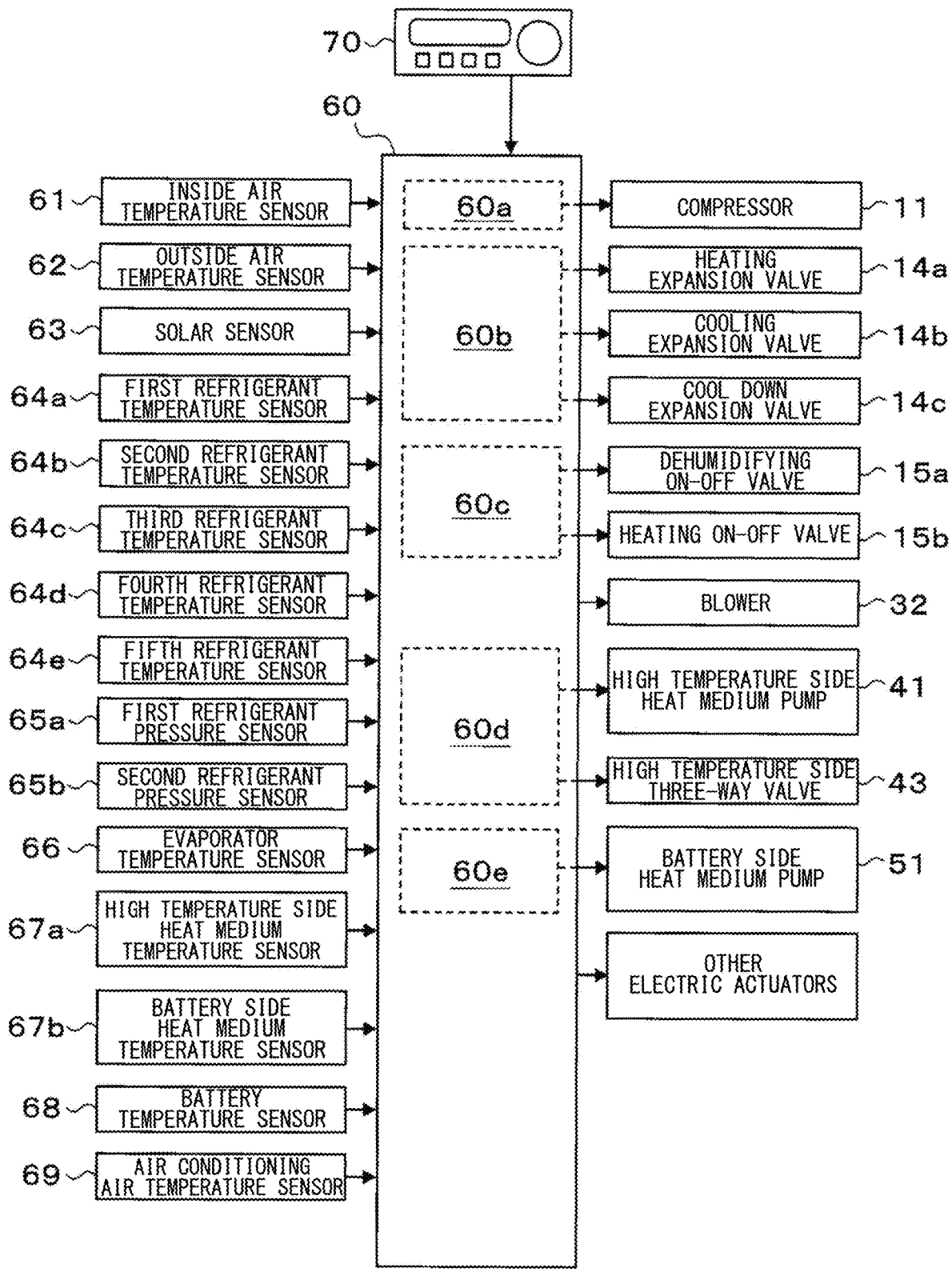
FIG. 2 is a block diagram showing a control system of a vehicle air conditioner according to an embodiment.

Further, as shown in FIG. 2, an operation panel 70 is connected to the input side of the controller 60. The operation panel 70 is disposed in a vicinity of the instrument panel that is located in the forefront portion of the vehicle cabin and includes various operation switches. Therefore, operation signals from various operation switches provided on the operation panel 70 are input to the controller 60.

Specific examples of the various operation switches on the operation panel 70 include an auto switch that sets or cancels the automatic control operation of the vehicle air conditioner, and an air conditioner switch that requires the inside evaporator 18 to cool the ventilation air. Further, the various operation switches of the operation panel 70 include an air volume setting switch for manually setting the air volume of the blower 32, a temperature setting switch for setting the target temperature Tset in the vehicle interior, a blowout mode changeover switch for manually setting the blowout mode, and the like.

Further, the controller 60 integrally includes control units that control the various control target devices connected to the output side of the controller 60. Structure (e.g., hardware and software) controlling operations of the respective controlled devices constitute the control units that control the operations of the respective controlled device.

For example, in the control unit 60, the structure that controls the refrigerant discharge capacity of the compressor 11 (specifically, the rotation speed of the compressor 11)

constitutes the compressor control unit 60a. Further, the structure for controlling the operation of the heating expansion valve 14a, the cooling expansion valve 14b, and the cool down expansion valve 14c constitutes the expansion valve control unit 60b. The structure that controls the operation of the dehumidifying on-off valve 15a and the heating on-off valve 15b constitutes the refrigerant circuit switching control unit 60c.

Further, the structure for controlling the operation of the high temperature side heat medium pump 41 and the high temperature side three way valve 43 of the high temperature side heat medium circuit 40 constitutes a heat dissipation amount control unit 60d which controls the dissipation heat amount of the discharge refrigerant in the water-refrigerant heat exchanger 12 and the high temperature side heat medium circuit 40.

Further, the structure for controlling the pump capacity of the battery side heat medium of the battery side heat medium pump 51 in the battery side heat medium circuit 50 constitutes the battery side heat medium temperature control unit 60e.

Next, an operation of the vehicle air conditioner 1 configured as described above will be described. As described above, the vehicle air conditioner 1 of the present embodiment has a function of adjusting the temperature of the battery 80 in addition to the function of air conditioning the interior of the vehicle. Therefore, in the vehicle air conditioner 1, the refrigerant circuit can be switched to operate between the following 12 types of operation modes.

(1) Sole cooling mode: The sole cooling mode is an operation mode in which the inside of the vehicle is cooled by cooling the ventilation air and blowing the ventilation air into the vehicle interior without adjusting the temperature of the battery 80. (2) Sole series dehumidifying and heating mode: The sole series dehumidifying and heating mode is an operation mode in which the vehicle compartment is dehumidified and heated by reheating the blown air cooled and dehumidified, and blowing the air into the vehicle compartment without adjusting the temperature of the battery 80.

(3) Sole parallel dehumidifying and heating mode: The sole parallel dehumidifying and heating mode is an operation mode in which the vehicle compartment is dehumidified and heated by reheating the blown air cooled and dehumidified with a heating capacity greater than the series dehumidifying and heating mode, and blowing the air into the vehicle compartment without adjusting the temperature of the battery 80. (4) Sole heating mode: The sole heating mode is an operation mode in which the inside of the vehicle is heated by heating the ventilation air and blowing the ventilation air into the vehicle interior without adjusting the temperature of the battery 80. (5) Sole warm up mode: The sole warm up mode is an operation mode in which the battery 80 is warmed up without air conditioning the vehicle interior. The sole warm up mode is an example of a target warm up mode.

(6) Heating and warm up mode: The heating and warm up mode is an operation mode in which the vehicle compartment is heated by heating and discharging the blown air into the vehicle compartment, and in which the battery 80 is warmed up. The heating and warm up mode is an example of a target warm up mode.

(7) Sole cool down mode: The sole cool down mode is an operation mode in which the battery 80 is cooled without air conditioning the interior of the vehicle.

(8) Cooling and cool down mode: The cooling and cool down mode is an operation mode in which the vehicle compartment is cooled by cooling and discharging the ventilation air into the vehicle compartment, and simultaneously cooling the battery 80.

(9) Series dehumidifying and heating, and cool down mode: The series dehumidifying and heating and cool down mode is an operation mode in which the ventilation air, which has been cooled and dehumidified, is reheated and discharged into the vehicle compartment such that the vehicle compartment is dehumidified and heated, and simultaneously cooling the battery 80.

(10) Parallel dehumidifying and heating, and cool down mode: The parallel dehumidifying and heating and cool down mode is an operation mode in which the ventilation air, which has been cooled and dehumidified, is reheated with a greater heat capacity as compared to the series dehumidifying and heating and cool down mode and discharged into the vehicle compartment such that the vehicle compartment is dehumidified and heated, and simultaneously cooling the battery 80. (11) First heating and cool down mode: The first heating and cool down mode is one embodiment of an operation mode in which the ventilation air is heated and blown into the vehicle compartment to heat the vehicle interior, and simultaneously cooling the battery 80. In the first heating and cool down mode, the outside heat exchanger 16 functions as a radiator or an evaporator, so that the capacity balance between the heating of the vehicle interior and the cooling of the battery 80 can be adjusted.

(11) Second heating and cool down mode: The second heating and cool down mode is another embodiment of an operation mode in which the ventilation air is heated and blown into the vehicle compartment to heat the vehicle interior, and simultaneously cooling the battery 80. In the second heating and cool down mode, the influence of heat exchange with the outside air in the outside heat exchanger 16 is eliminated, and it is possible to heat the vehicle interior and cool the battery 80.

Switching between each operation mode in the vehicle air conditioner 1 is performed by executing control programs stored in advance in the controller 60. In these control programs, the detection signals from the sensors described above and the operation signals from the operation panel 70 are read each time a predetermined control period elapses. Then, the target blowout temperature TAO of the ventilation air blown into the vehicle interior is determined using the read detection signals and operation signals.

Specifically, the target blowout temperature TAO is calculated by the following formula F1.

$$TAO = Kset \times Tset - Kr \times Tr - Kam \times Tam - Ks \times Ts + C \quad \text{(F1)}$$

Tset is the vehicle interior set temperature set by the temperature setting switch. Tr is the vehicle interior temperature detected by the inside air temperature sensor 61. Tam is the temperature outside of the vehicle interior detected by the outside air temperature sensor 62. Ts is the amount of solar radiation detected by the solar sensor 63. Kset, Kr, Kam, and Ks are control gains, and C is a constant for correction.

Further, in the control programs, a single operation mode among 11 types of operation modes is determined and switched to depending on the situation of the vehicle air condition 1, specifically, based on the target blowout temperature TAO, the battery temperature TB detected by the battery temperature sensor 68, the operation signal from the operation panel 70, etc.

Specifically, when the air conditioner switch of the operation panel 70 is turned on and the target blowout temperature TAO is equal to or lower than a predetermined cooling reference temperature, the air conditioning mode of the operation mode is determined to be the cooling operation.

In this case, when the battery temperature TB is equal to or higher than a predetermined reference upper limit temperature KTBH (40° C. in this embodiment), the operation mode is switched to the cooling and cool down mode. When the battery temperature TB is equal to or higher than a predetermined reference lower limit temperature KTBL (20° C. in this embodiment) and lower than the reference upper limit temperature KTBH (that is, within an appropriate temperature range), the operation mode can be switched to the sole cooling mode.

Further, when the air conditioning switch of the operation panel 70 is turned on, and the target blowout temperature TAO is higher than the cooling reference temperature and is equal to or lower than a predetermined dehumidifying reference temperature, the air conditioning mode of the operation mode is determined to be the series dehumidifying and heating operation.

In this case, when the battery temperature TB is equal to or higher than the reference upper limit temperature KTBH, the operation mode is switched to the series dehumidifying and heating and cool down mode. When the battery temperature TB is equal to or higher than the reference lower limit temperature KTBL and lower than the reference upper limit temperature KTBH, the operation mode is switched to the sole series dehumidifying and heating mode.

Further, when the air conditioner switch of the operation panel 70 turned on, and the target blowout temperature TAO is higher than the cooling reference temperature and the dehumidifying reference temperature, the air conditioning mode of the operation mode is determined to be the parallel dehumidifying and heating operation.

In this case, when the battery temperature TB is equal to or higher than the reference upper limit temperature KTBH, the operation mode is switched to the parallel dehumidifying and heating and cool down mode. When the battery temperature TB is equal to or higher than the reference lower limit temperature KTBL and lower than the reference upper limit temperature KTBH, the operation mode is switched to the sole parallel dehumidifying and heating mode.

When the air conditioner switch is not turned on, or when the outside air temperature Tam is below a predetermined reference outside air temperature, if the target blowout temperature TAO is above a predetermined heating reference temperature, the air conditioning mode of the operation mode is determined to be a heating operation.

In this case, when the battery temperature TB is equal to or higher than the reference upper limit temperature KTBH, the operation mode is switched to either the first heating and cool down mode or the second heating and cool down mode. Then, when the battery temperature TB is equal to or lower than the reference lower limit temperature KTBL, the operation mode is switched to the heating and warm up mode. When the battery temperature TB is equal to or higher than the reference lower limit temperature KTBL and is lower than the reference upper limit temperature KTBH, the operation mode is switched to the sole heating mode.

Further, when the air conditioning in the vehicle interior is not performed, such as when the automatic air conditioning operation is canceled by the operation of the auto switch, temperature adjustment of the battery 80 is performed. That is, in this situation, when the battery temperature TB is equal to or higher than the reference upper limit temperature KTBH, the operation mode is switched to the sole cool down mode. Further, when the battery temperature TB is equal to or lower than the reference lower limit temperature KTBL, the operation mode is switched to the sole warm up mode.

Here, it is desirable that the temperature of the battery 80 is always maintained within an appropriate temperature range when the vehicle system is activated, regardless of whether or not the vehicle interior is being air conditioned.

Therefore, when the vehicle system is activated, it is desirable that the refrigeration cycle device 10 is operating in an operation mode in which the temperature of the battery 80 can be adjusted. The operation modes in which the temperature of the battery 80 can be adjusted are the cooling and cool down mode, the dehumidifying heating and cool down mode, the heating and warm up mode, the first heating and cool down mode, the second heating and cool down mode, the sole cool down mode, and the sole warm up mode.

Therefore, in the control program of the present embodiment, when a predetermined operation condition is satisfied, the operation is switched between the sole cool down mode and the sole warm up mode.

Next, the detailed operation of the refrigeration cycle device 10 in each operation mode of the vehicle air conditioner 1 will be described in detail.

(1) Sole Cooling Mode

In the sole cooling mode, the heating expansion valve 14a is fully opened and the cool down expansion valve 14c is fully closed. Then, the cooling expansion valve 14b is in a throttled state defined in the sole cooling mode. Further, the dehumidifying on-off valve 15a is closed and the heating on-off valve 15b is closed.

Further, in the sole cooling mode, the controller 60 controls the operation of the high temperature side heat medium pump 41 so as to provide a predetermined heat medium pumping capacity for the sole cooling mode, and controls the battery side heat medium pump 51 to stop. Further, the controller 60 controls the operation of the high temperature side three way valve 43 so that the high temperature side heat medium flowing out from the heater core 42 flows into the high temperature side radiator 44.

In the refrigeration cycle device 10 in the sole cooling mode, the refrigerant flows, in order, through the compressor 11, the water-refrigerant heat exchanger 12, (the heating expansion valve 14a), the outside heat exchanger 16, the check valve 17, the cooling expansion valve 14b, the inside evaporator 18, the evaporation pressure adjusting valve 20, the accumulator 21, and then back to the compressor 11.

In this cycle, the controller 60 determines operation states of the control target devices (i.e., controlling signals output to the control target devices) based on the target blowout temperature TAO and detecting signals from the sensors.

For example, the refrigerant discharge capacity of the compressor 11 in the sole cooling mode (that is, the control signal output to the electric motor of the compressor 11) is determined as follows. First, a target evaporator temperature TEO is determined based on the target blowout temperature TAO with reference to a control map stored in advance in the controller 60.

The control signal output to the compressor 11 is determined based on the deviation between the target evaporator temperature TEO and the evaporator temperature Tefin detected by the evaporator temperature sensor 66. Specifically, a feedback control method is used to cause the evaporator temperature Tefin to approach the target evaporator temperature TEO.

The controlling signal output to the cooling expansion valve 14b is determined such that a subcooling degree of the refrigerant to flow into the cooling expansion valve 14b approaches a predetermined target subcooling degree in order to maximize the COP.

Further, the actuator for the air mix door is controlled so that the opening degree of the air mix door 34 is set to an opening degree SW determined by using the following formula F2.

$$SW = \{TAO(\text{Tefin}+C2)\}/\{TWH(\text{Tefin}+C2)\} \quad (F2)$$

TWH is a high temperature side heat medium temperature detected by the high temperature side heat medium temperature sensor 66a. C2 is a constant for control. The opening degree of the air mix door 34 is defined such that as SW increases, the passage area of the passage on the heater core 42 side increases. Conversely, as SW decreases, the passage area on the cold air bypass passage 35 side increases.

As a result, in the sole cooling mode, the water-refrigerant heat exchanger 12 and the outside heat exchanger 16 function as radiators, and the inside evaporator 18 functions as an evaporator. That is, the inside evaporator 18 can cool the ventilation air, and the water-refrigerant heat exchanger 12 can heat the high temperature side heat medium.

Therefore, the vehicle air conditioner 1 in the sole cooling mode is configured such that a part of the ventilation air cooled by the inside evaporator 18 is reheated by the heater core 42 by adjusting the opening degree of the air mix door 34, and it is possible to supply the ventilation air whose temperature is adjusted so as to approach the target blowout temperature TAO to the vehicle compartment. That is, the vehicle air conditioner 1 in the sole cooling mode can cool the vehicle interior.

At this time, since the heat exchange between the refrigerant and the battery side heat medium in the chiller 19 is not performed, the temperature of the battery 80 is not adjusted by the battery side heat medium. That is, the vehicle air conditioner 1 in the sole cooling mode can cool the interior of the vehicle without adjusting the temperature of the battery 80.

(2) Sole Series Dehumidifying and Heating Mode

In the sole series dehumidifying and heating mode, the heating expansion valve 14a and the cooling expansion valve 14b are each adjusted to a throttled opening degree determined in the sole series dehumidifying and heating mode, and the cool down expansion valve 14c is fully closed. Further, the dehumidifying on-off valve 15a is closed, and the heating on-off valve 15b is closed.

Further, in the sole series dehumidifying and heating mode, the controller 60 controls the operation of the high temperature side heat medium pump 41 so as to provide a predetermined heat medium pumping capacity for the sole series dehumidifying and heating mode, and controls the battery side heat medium pump 51 to stop. Further, the controller 60 controls the operation of the high temperature side three way valve 43 so that the high temperature side heat medium flowing out from the heater core 42 flows into the high temperature side radiator 44.

Therefore, in the sole series dehumidifying and heating mode, a vapor compression refrigeration cycle is provided. In the sole dehumidifying and heating mode, the refrigerant flows, in order, through the compressor 11, the water-refrigerant heat exchanger 12, the heating expansion valve 14a, the outside heat exchanger 16, the check valve 17, the cooling expansion valve 14b, the inside evaporator 18, the evaporation pressure adjusting valve 20, the accumulator 21, and then back to the compressor 11.

In this cycle, the controller 60 determines operation states of the control target devices (i.e., controlling signals output to the control target devices) based on the target blowout temperature TAO and detecting signals from the sensors.

In the sole series dehumidifying and heating mode, the determination of the target evaporator temperature TEO and the determination of the control signal for the compressor 11 are executed in the same manner as in the sole cooling mode described above.

The throttle opening of the heating expansion valve 14a and the cooling expansion valve 14b in the sole series dehumidifying and heating mode is determined with reference to the control map stored in the controller 60 based on the target blowout temperature TAO. Specifically, as the target blowout temperature TAO rises, it is determined that the throttle opening degree of the heating expansion valve 14a should be decreased, and the throttle opening of the cooling expansion valve 14b should be increased.

Further, the actuator for the air mix door is controlled in the same manner as in the sole cooling mode. Since the target blowout temperature TAO is higher than that in the sole cooling mode, the opening degree SW of the air mix door 34 approaches 100%. Therefore, in the sole series dehumidifying and heating mode, the opening degree of the air mix door 34 is determined so that most of the flow rate of the ventilation air, after having passed through the inside evaporator 18, passes through the heater core 42.

As a result, in the sole series dehumidifying and heating mode, a vapor compression refrigeration cycle is configured in which the water-refrigerant heat exchanger 12 functions as a radiator and the inside evaporator 18 functions as an evaporator.

Further, when a saturation temperature of the refrigerant in the outside heat exchanger 16 is higher than the outside air temperature Tam, a cycle in which the outside heat exchanger 16 functions as a radiator is configured. When the saturation temperature of the refrigerant in the outside heat exchanger 16 is lower than the outside air temperature Tam, the outside heat exchanger 16 functions as an evaporator in the cycle.

According to this, the ventilation air can be cooled by the inside evaporator 18, and the ventilation air that has been cooled and dehumidified can be reheated via the water-refrigerant heat exchanger 12 and the heater core 42. Therefore, the vehicle air conditioner 1 in the sole series dehumidifying and heating mode can perform dehumidifying and heating in the vehicle interior.

Further, when the saturation temperature of the refrigerant in the outside heat exchanger 16 is higher than the outside air temperature Tam, as the target blowout temperature TAO rises, the throttle opening degree of the heating expansion valve 14a is reduced and the throttle opening degree of the cooling expansion valve 14b is increased. As a result, the saturation temperature of the refrigerant in the outside heat exchanger 16 is lowered, and the difference from the outside air temperature Tam is reduced.

As a result, the amount of heat released from the refrigerant in the outside heat exchanger 16 can be reduced, the amount of heat released from the refrigerant in the water-refrigerant heat exchanger 12 can be increased, and the heating capacity of the ventilation air by the heater core 42 can be improved.

Further, when the saturation temperature of the refrigerant in the outside heat exchanger 16 is lower than the outside air temperature Tam, as the target blowout temperature TAO rises, the throttle opening degree of the heating expansion valve 14a is reduced and the throttle opening degree of the cooling expansion valve 14b is increased. As a result, the mild temperature of the refrigerant in the outside heat exchanger 16 decreases, and the temperature difference from the outside air temperature Tam increases.

As a result, the amount of heat absorbed from the refrigerant in the outside heat exchanger 16 can be increased, the amount of heat released from the refrigerant in the water-refrigerant heat exchanger 12 can be increased, and the heating capacity of the ventilation air by the heater core 42 can be improved.

That is, in the sole series dehumidifying and heating mode, the throttle opening degree of the heating expansion valve 14a is reduced and the throttle opening degree of the cooling expansion valve 14b is increased as the target blowout temperature TAO rises. As a result, the amount of heat released from the refrigerant in the water-refrigerant heat exchanger 12 can be increased. Therefore, in the sole series dehumidifying and heating mode, the heating capacity of the ventilation air by the water-refrigerant heat exchanger 12 and the high temperature side heat medium circuit 40 can be improved as the target blowout temperature TAO rises.

(3) Sole Parallel Dehumidifying and Heating Mode

In the sole parallel dehumidifying and heating mode, the heating expansion valve 14a and the cooling expansion valve 14b are each adjusted to a throttled opening degree determined in the sole parallel dehumidifying and heating mode, and the cool down expansion valve 14c is fully closed. Further, the dehumidifying on-off valve 15a is opened, and the heating on-off valve 15b is opened.

Further, in the sole parallel dehumidifying and heating mode, the controller 60 controls the operation of the high temperature side heat medium pump 41 so as to provide a predetermined heat medium pumping capacity for the sole parallel dehumidifying and heating mode, and controls the battery side heat medium pump 51 to stop. Further, the controller 60 controls the operation of the high temperature side three way valve 43 so that the high temperature side heat medium flowing out from the heater core 42 flows into the high temperature side radiator 44.

Therefore, in the sole parallel dehumidifying and heating mode, the refrigerant circulates, in this order, through the compressor 11, the water-refrigerant heat exchanger 12, the heating expansion valve 14a, the outside heat exchanger 16, the heating passage 22b, the accumulator 21, and then back to the compressor 11. At the same time, a steam compression type refrigeration circuit is formed in which the refrigerant circulates, in this order, through the compressor 11, the water-refrigerant heat exchanger 12, the bypass passage 22a, the cooling expansion valve 14b, the inside evaporator 18, the evaporation pressure adjusting valve 20, the accumulator 21, and the compressor 11.

In this cycle, the controller 60 determines operation states of the control target devices (i.e., controlling signals output to the control target devices) based on the target blowout temperature TAO and detecting signals from the sensors.

For example, the throttle opening degree of the heating expansion valve 14a and the cooling expansion valve 14b in the sole parallel dehumidifying and heating mode is determined as follows. First, a target superheat degree SHEO of the refrigerant on the outlet side of the inside evaporator 18 is determined. As the target superheat degree SHEO, a predetermined constant (for example, 5° C.) can be adopted.

The throttle opening degree of the heating expansion valve 14a and the cooling expansion valve 14b are determined by a feedback control method based on the deviation between the target superheat degree SHEO and the superheat degree SHE of the refrigerant on the outlet side of the inside evaporator 18, and are determined such that the superheat degree SHE approaches the target superheat degree SHEO.

Further, the actuator for the air mix door is controlled in the same manner as in the sole cooling mode. Since the target blowout temperature TAO is higher than that in the sole cooling mode, the opening degree SW of the air mix door 34 approaches 100% as in the sole series dehumidifying and heating mode. Therefore, in the sole parallel dehumidifying and heating mode, the opening degree of the air mix door 34 is determined so that most of the flow rate of the ventilation air, after having passed through the inside evaporator 18, passes through the heater core 42.

As a result, in the sole parallel dehumidifying and heating mode, the refrigeration circuit is configured such that the water-refrigerant heat exchanger 12 functions as a radiator, and the outside heat exchanger 16 and the inside evaporator 18 connected in parallel to the refrigerant flow function as evaporators.

According to this, the ventilation air can be cooled by the inside evaporator 18, and the ventilation air that has been cooled and dehumidified can be reheated via the water-refrigerant heat exchanger 12 and the heater core 42. Therefore, the vehicle air conditioner 1 in the sole parallel dehumidifying and heating mode can perform dehumidifying and heating in the vehicle interior.

Further, in the refrigeration cycle device 10 during the sole parallel dehumidifying and heating mode, the outside heat exchanger 16 and the inside evaporator 18 are connected in parallel with respect to the refrigerant flow, and the evaporation pressure adjusting valve 20 is disposed downstream of the inside evaporator 18. As a result, the refrigerant evaporation temperature in the outside heat exchanger 16 can be set to be lower than the refrigerant evaporation temperature in the inside evaporator 18.

Therefore, in the sole parallel dehumidifying and heating mode, the heat absorption amount of the refrigerant in the outside heat exchanger 16 can be increased more than that in the sole series dehumidifying and heating mode, and the heat dissipation amount of the refrigerant in the water-refrigerant heat exchanger 12 can be increased more than that in the sole series dehumidifying and heating mode. As a result, in the sole parallel dehumidifying and heating mode, the ventilation air can be reheated with a higher heating capacity than in the sole series dehumidifying and heating mode.

(4) Sole Heating Mode

In the sole heating mode, the heating expansion valve 14a is adjusted to a throttle opening degree determined in the sole heating mode, and the cooling expansion valve 14b and the cool down expansion valve 14c are fully closed. Further, the dehumidifying on-off valve 15a is closed, and the heating on-off valve 15b is opened.

Further, in the sole heating mode, the controller 60 controls the operation of the high temperature side heat medium pump 41 so as to provide a predetermined heat medium pumping capacity for the sole heating mode, and controls the battery side heat medium pump 51 to stop. Further, the controller 60 controls the operation of the high temperature side three way valve 43 so that the high temperature side heat medium flowing out from the heater core 42 flows out to the suction port side of the high temperature side heat medium pump 41.

Therefore, in the sole heating mode, a steam compression type refrigeration circuit is formed in which the refrigerant circulates, in this order, through the compressor 11, the water-refrigerant heat exchanger 12, the heating expansion valve 14a, the outside heat exchanger 16, the heating passage 22b, the accumulator 21, and then back to the compressor 11.

In this cycle, the controller 60 determines operation states of the control target devices (i.e., controlling signals output to the control target devices) based on the target blowout temperature TAO and detecting signals from the sensors.

For example, the throttle opening degree of the heating expansion valve 14a in the heating mode may be determined as follows. First, a target sub cool degree SCO of the refrigerant flowing out from the refrigerant passage of the water-refrigerant heat exchanger 12 is determined. The target sub cool degree SCO is determined by referring to a control map based on the suction temperature of the ventilation air flowing into the inside evaporator 18 or the outside air temperature Tam. In the control map, the target sub cool degree SCO is determined so that the coefficient of performance (COP) of the cycle is maximized.

The throttle opening degree of the heating expansion valve 14a is determined by a feedback control method based on the deviation between the target sub cool degree SCO and the sub cool degree SC of the refrigerant flowing out from the refrigerant passage of the water-refrigerant heat exchanger 12. The throttle opening degree of the heating expansion valve 14a is determined so that the sub cool degree SC of the refrigerant flowing out from the refrigerant passage of the water-refrigerant heat exchanger 12 approaches the target sub cool degree SCO.

Further, the actuator for the air mix door is controlled in the same manner as in the sole cooling mode. Since the target blowout temperature TAO is higher than that in the sole cooling mode, the opening degree SW of the air mix door 34 approaches 100%. Therefore, in the sole heating mode, the opening degree of the air mix door 34 is determined so that most of the flow rate of the ventilation air, after having passed through the inside evaporator 18, passes through the heater core 42.

That is, in the refrigeration cycle device 10 in the sole heating mode, a refrigeration cycle is configured in which the water-refrigerant heat exchanger 12 functions as a radiator and the outside heat exchanger 16 functions as an evaporator. As a result, since the ventilation air can be heated by the water-refrigerant heat exchanger 12 and the heater core 42, the inside of the vehicle can be heated by blowing out the heated ventilation air into the vehicle interior.

(5) Sole Warm Up Mode

In the sole warm up mode, the heating expansion valve 14a and the cooling expansion valve 14b are fully closed, and the cool down expansion valve 14c is adjusted to a throttle opening degree determined in the sole warm up mode. Further, the dehumidifying on-off valve 15a is opened and the heating on-off valve 15b is closed.

Further, in the sole warm up mode, the controller 60 controls the operation of the battery side heat medium pump 51 so as to provide a predetermined heat medium pumping capacity for the sole warm up mode, and controls the high temperature side heat medium pump 41 to stop.

Accordingly, in the sole warm up mode, a steam compression type refrigeration circuit is formed in which the refrigerant circulates, in this order, through the compressor 11, (the water-refrigerant heat exchanger 12), the bypass passage 22a, the cool down expansion valve 14c, the chiller 19, the evaporation pressure adjusting valve 20, the accumulator 21, and the compressor 11.

With this circuit configuration, the controller 60 appropriately controls the operation of each control target device. For example, for the compressor 11, the rotation speed is controlled so that a battery side heat medium temperature TWC approaches a target battery side heat medium temperature TWCO.

The target battery side heat medium temperature TWCO is determined based on the battery temperature TB with reference to the control map for the sole warm up mode stored in advance in the controller 60. In this control map, it is determined that the target battery side heat medium temperature TWCO is lower as the battery temperature TB is higher. Further, in the sole warm up mode, the target battery side heat medium temperature TWCO is determined to be higher than the temperature of the battery side heat medium flowing into the water passage of the chiller 19. The opening degree SW of the actuator for the air mix door is controlled to be 0%.

Figure 3:
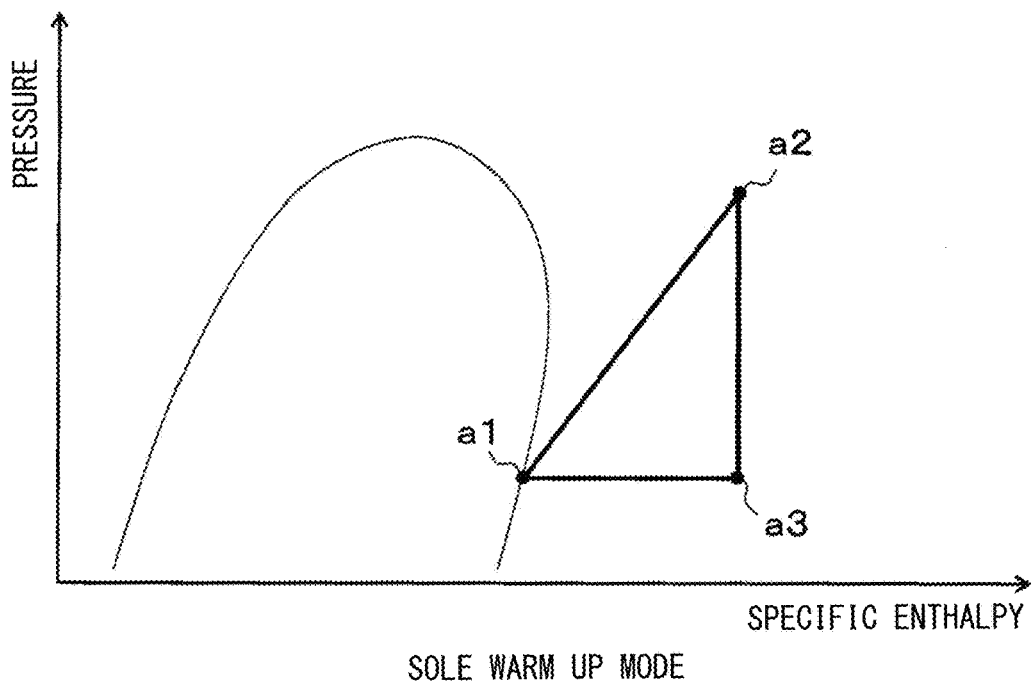
FIG. 3 is a Mollier diagram showing changes in the state of a refrigerant in a sole warm up mode of the refrigeration cycle device according to the embodiment.

Therefore, in the refrigeration cycle device 10 in the sole warm up mode, the state of the refrigerant changes as shown in the Mollier diagram of FIG. 3. That is, as shown by points a1 to a2 in FIG. 3, the refrigerant sucked into the compressor 11 is discharged in a state of being compressed to a high temperature and a high pressure.

The high pressure refrigerant discharged from the compressor 11 flows into the water-refrigerant heat exchanger 12. Here, since the operation of the high temperature side heat medium pump 41 is stopped in the sole warm up mode, the refrigerant flowing into the water-refrigerant heat exchanger 12 hardly dissipates heat to the high temperature side heat medium, and flows out toward the bypass passage 22a. Therefore, the refrigerant flowing out of the water-refrigerant heat exchanger 12 passes through the bypass passage 22a in a state of high temperature and high pressure hot gas, and reaches the cool down expansion valve 14c.

As shown at points a2 to a3 in FIG. 3, when the refrigerant flows into the cool down expansion valve 14c, the superheated refrigerant is depressurized until it becomes a low pressure refrigerant. The refrigerant pressure reduced by the cool down expansion valve 14c flows into the chiller 19 in a superheated state.

At this time, in the battery side heat medium circuit 50, the battery side heat medium pump 51 exerts a predetermined heat medium pumping capacity. Therefore, as shown by points a3 to a1 in FIG. 3, the heat of the superheated refrigerant is dissipated to the battery side heat medium by the chiller 19. As a result, the battery side heat medium is heated by using the superheated refrigerant as a heat source.

Then, in the battery side heat medium circuit 50, the battery side heat medium heated by the chiller 19 flows into the heat exchange unit 52 by the operation of the battery side heat medium pump 51 and exchanges heat with the battery 80. As a result, the battery 80 is heated, and the battery 80 can be warmed up. The battery side heat medium flowing out of the heat exchange unit 52 is sucked into the battery side heat medium pump 51 and again pressure fed to the water passage of the chiller 19.

The refrigerant flowing out of the chiller 19 flows into the accumulator 21 via the sixth three way joint 13f and the evaporation pressure adjusting valve 20, and is gas liquid separated. Then, the vapor phase refrigerant separated by the accumulator 21 is sucked from the suction side of the compressor 11 and compressed again by the compressor 11.

As described above, in the refrigeration cycle device 10 in the sole warm up mode, a refrigeration circuit is formed in which the chiller 19 functions as a radiator. Further, in the sole warm up mode, the battery side heat medium can be heated by the chiller 19, and the battery 80 can be warmed up via the battery side heat medium.

Further, in the sole warm up mode, since the high temperature side heat medium pump 41 is stopped, the refrigerant flowing into the refrigerant passage of the water-refrigerant heat exchanger 12 hardly dissipates heat from the water-refrigerant heat exchanger 12, and then flows out. Therefore, the ventilation air is not heated by the heater core 42.

That is, in the vehicle air conditioner 1 in the sole warm up mode, the battery 80 can be heated and warmed up by the battery side heat medium being heated by the chiller 19 and flowing into the heat exchange unit 52, without air conditioning the interior of the vehicle.

(6) Heating and Warm Up Mode

In the heating and warm up mode, the heating expansion valve 14a and the cooling expansion valve 14b are fully closed, and the cool down expansion valve 14c is adjusted to a throttle opening degree determined in the heating and warm up mode. Further, the dehumidifying on-off valve 15a is opened and the heating on-off valve 15b is closed.

Further, in the heating and warming mode, the controller 60 controls the operation of each of the high temperature side heat medium pump 41 and the battery side heat medium pump 51 so as to exert predetermined heat medium pumping capacities for the heating and warm up mode. At this time, the heat medium pumping capacity of the high temperature side heat medium pump 41 is set to be lower than the heat medium pumping capacity of the high temperature side heat medium pump 41 in the sole heating mode. Further, the controller 60 controls the operation of the high temperature side three way valve 43 so that the high temperature side heat medium flowing out from the heater core 42 flows out to the suction port side of the high temperature side heat medium pump 41.

Accordingly, in the heating and warm up mode, a steam compression type refrigeration circuit is formed in which the refrigerant circulates, in this order, through the compressor 11, the water-refrigerant heat exchanger 12, the bypass passage 22a, the cool down expansion valve 14c, the chiller 19, the evaporation pressure adjusting valve 20, the accumulator 21, and the compressor 11.

With this circuit configuration, the controller 60 appropriately controls the operation of each control target device. For example, with respect to the compressor 11, the rotation speed of the compressor 11 is controlled so that the high temperature side heat medium temperature TWH approaches the target high temperature side heat medium temperature TWHO.

The target high temperature side heat medium temperature TWHO is determined based on the target blowout temperature TAO with reference to a control map stored in advance in the controller 60. In this control map, it is determined that the target high temperature side heat medium temperature TWHO is increased as the target blowout temperature TAO increases, so that the temperature of the ventilation air blown into the vehicle interior approaches the target blowout temperature TAO.

The throttle opening degree of the cool down expansion valve 14c is controlled so that the battery side heat medium temperature TWC approaches the target battery side heat medium temperature TWCO. The target battery side heat medium temperature TWCO in this case is determined based on the battery temperature TB with reference to a control map for the heating and warm up mode stored in advance in the controller 60. Further, the target battery side heat medium temperature TWCO is determined to be higher than the temperature of the battery side heat medium flowing into the water passage of the chiller 19.

The actuator for the air mix door is controlled in the same manner as in the sole cooling mode. Here, in the heating and warm up mode, the target blowout temperature TAO is relatively high, so that the opening degree SW of the air mix door 34 approaches 100%. Therefore, in the heating and warm up mode, the air mix door 34 is displaced so that approximately the entire flow amount of the blown air after passing through the inside evaporator 18 passes through the heater core 42.

As described above, the heat medium pumping capacity of the high temperature side heat medium pump 41 is controlled to be lower than that in the sole heating mode. Various methods can be adopted as the control method for realizing this. For example, the rotation speed of the high temperature side heat medium pump 41 may be lower than that in the case of the sole heating mode, or the high temperature side heat medium pump 41 may be controlled to periodically operate and stop, repeatedly.

Figure 4:
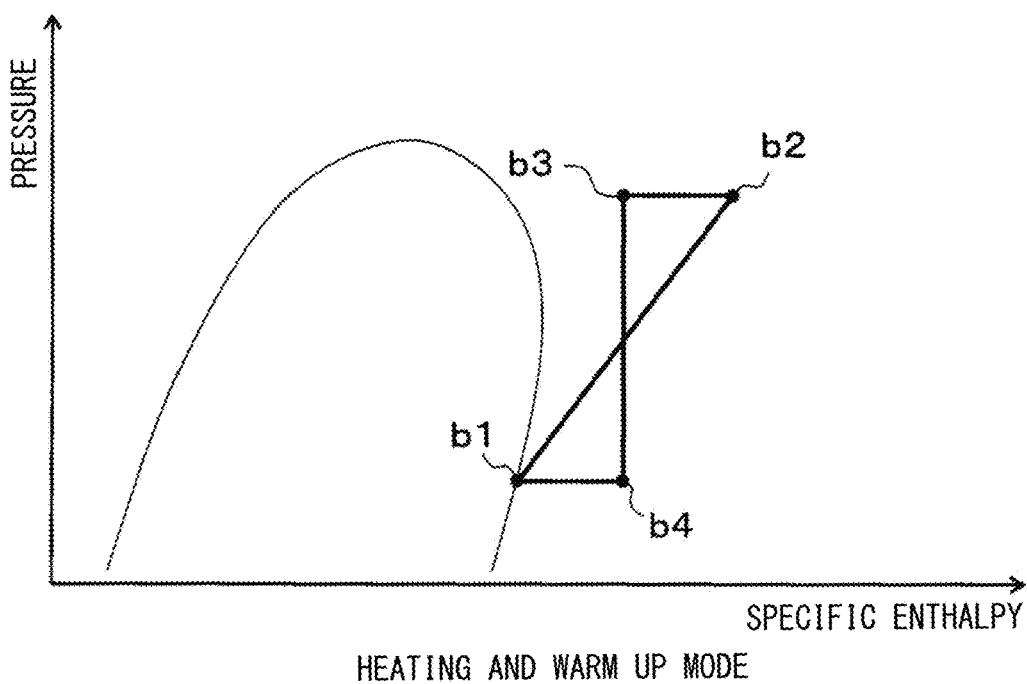
FIG. 4 is a Mollier diagram showing changes in the state of a refrigerant in a heating and warm up mode of the refrigeration cycle device according to the embodiment.

Therefore, in the refrigeration cycle device 10 in the heating and warm up mode, the state of the refrigerant changes as shown in the Mollier diagram of FIG. 4. That is, as shown by points b1 to b2 in FIG. 4, the refrigerant sucked into the compressor 11 is discharged in a state of being compressed to a high temperature and a high pressure.

The high pressure refrigerant discharged from the compressor 11 flows into the water-refrigerant heat exchanger 12. Here, in the heating and warm up mode, the high temperature side heat medium pump 41 pumps the high temperature side heat medium with a predetermined heat medium pumping capacity. Therefore, as shown at points b2 to b3 in FIG. 4, the heat of the refrigerant flowing into the water-refrigerant heat exchanger 12 is dissipated to the high temperature side heat medium circulating in the high temperature side heat medium circuit 40. In the heating and warm up mode, the refrigerant dissipates heat in the chiller 19 as well, so that the amount of heat dissipated by the refrigerant in the water-refrigerant heat exchanger 12 is lower than that in the sole warm up mode.

Then, in the high temperature side heat medium circuit 40, the high temperature side heat medium heated by the water-refrigerant heat exchanger 12 flows into the heater core 42 by the operation of the high temperature side heat medium pump 41 and exchanges heat with ventilation air flowing inside the inside air conditioning unit 30. As a result, the temperature of the ventilation air blown into the vehicle interior approaches the target blowout temperature TAO.

That is, since the vehicle air conditioner 1 can supply the ventilation air heated by the heater core 42 to the vehicle interior, which is the air conditioning target space, it is possible to heat the vehicle interior. The high temperature side heat medium is sucked from the heater core 42 into the high temperature side heat medium pump 41, and is pumped again to the water passage of the water-refrigerant heat exchanger 12.

When the refrigerant flowing out of the water-refrigerant heat exchanger 12, the refrigerant passes through the bypass passage 22a in a state of high temperature and high pressure hot gas, and reaches the cool down expansion valve 14c. As shown at points b3 to b4 in FIG. 4, when the refrigerant flows into the cool down expansion valve 14c, the superheated refrigerant is depressurized until it becomes a low pressure refrigerant. The refrigerant pressure reduced by the cool down expansion valve 14c flows into the chiller 19 in a superheated state.

At this time, in the battery side heat medium circuit 50, the battery side heat medium pump 51 exerts a predetermined heat medium pumping capacity. Therefore, as shown at points b4 to b1 in FIG. 4, the heat of the superheated refrigerant is dissipated to the battery side heat medium by the chiller 19. As a result, the battery side heat medium is heated by using the superheated refrigerant as a heat source.

Then, in the battery side heat medium circuit 50, the battery side heat medium heated by the chiller 19 flows into the heat exchange unit 52 by the operation of the battery side heat medium pump 51 and exchanges heat with the battery 80. As a result, the battery 80 can be heated to warm up the battery 80. The battery side heat medium flowing out of the heat exchange unit 52 is sucked into the battery side heat medium pump 51 and again pressure fed to the water passage of the chiller 19.

The refrigerant flowing out of the chiller 19 flows into the accumulator 21 via the sixth three way joint 13f and the evaporation pressure adjusting valve 20, and is gas liquid separated. Then, the vapor phase refrigerant separated by the accumulator 21 is sucked from the suction side of the compressor 11 and compressed again by the compressor 11.

As described above, in the refrigeration cycle device 10 in the heating and warm up mode, a refrigeration circuit is formed in which the water-refrigerant heat exchanger 12 and the chiller 19 function as radiators. Therefore, in the refrigeration cycle device 10 in the heating and warm up mode, the high temperature side heat medium can be heated by the water-refrigerant heat exchanger 12. Further, the battery side heat medium can be heated by the chiller 19.

As a result, in the vehicle air conditioner 1 in the heating and warm up mode, the ventilation air can be heated via the high temperature side heat medium by using the refrigerant discharged from the compressor 11 as a heat source, and the interior of the vehicle can be heated. Further, the battery 80 can be heated to warm up the battery 80 by making the battery side heat medium heated by the chiller 19 flow into the heat exchange unit 52.

(7) Sole Cool Down Mode

In the sole cool down mode, the heating expansion valve 14a is fully opened, the cooling expansion valve 14b is fully closed, and the cool down expansion valve 14c is adjusted to a throttle opening degree determined in the sole cool down mode. Further, the dehumidifying on-off valve 15a is closed and the heating on-off valve 15b is closed.

Further, the controller 60 stops the operation of the high temperature side heat medium pump 41 so that the amount of heat radiated from the refrigerant heat exchanger 12 and the heater core 42 constituting the heating unit is minimized. Further, the controller 60 controls the operation of the battery side heat medium pump 51 so as to exert a predetermined heat medium pumping capacity for the sole cool down mode.

Therefore, in the refrigeration cycle device 10 in the sole cool down mode, a vapor compression refrigeration circuit is formed. In the sole cool down mode, the refrigerant flows, in order, through the compressor 11, (the water-refrigerant heat exchanger 12, the heating expansion valve 14a), the outside heat exchanger 16, the check valve 17, the cool down expansion valve 14c, the chiller 19, the evaporation pressure adjusting valve 20, the accumulator 21, and then back to the compressor 11.

With this circuit configuration, the controller 60 appropriately controls the operation of each control target device. For example, for the compressor 11, the rotation speed is controlled so that a battery side heat medium temperature TWC approaches a target battery side heat medium temperature TWCO.

The target battery side heat medium temperature TWCO is determined based on the battery temperature TB with reference to the control map for the sole cool down mode stored in advance in the controller 60. In this control map, it is determined that the target battery side heat medium temperature TWCO is lower as the battery temperature TB is higher. Further, in the sole cool down mode, the target battery side heat medium temperature TWCO is determined to be lower than the temperature of the battery side heat medium flowing into the water passage of the chiller 19.

Further, with respect to the cool down expansion valve 14c, its throttle opening degree is controlled so that the sub cool degree SC of the refrigerant flowing out from the outside heat exchanger 16 approaches the target sub cool degree SCO. The target sub cool degree SCO is determined based on the outside air temperature Tam with reference to the control map for the sole cool down mode stored in advance in the controller 60. In this control map, the target sub cool degree SCO is determined so that the COP of the cycle is maximized.

Further, the actuator for the air mix door is controlled so that the opening degree SW is 0%. That is, the cold air bypass passage 35 is fully opened, and the air passage on the heater core 42 side is fully closed.

Therefore, in the refrigeration cycle device 10 in the sole cool down mode, a refrigeration circuit is formed in which the outside heat exchanger 16 functions as a radiator and the chiller 19 functions as an evaporator. Therefore, the battery side heat medium can be cooled by the chiller 19 without adjusting the temperature of the ventilation air by the heater core 42 or the inside evaporator 18.

In the sole cool down mode, the air mix door 34 completely closes the air passage on the heater core 42 side. Therefore, the high temperature side heat medium heated by the water-refrigerant heat exchanger 12 hardly dissipates heat to the ventilation air via the heater core 42. Further, since the operation of the high temperature side heat medium pump 41 is stopped, the high temperature side heat medium does not circulate in the high temperature side heat medium circuit 40. That is, in the sole cool down mode, the ventilation air is not heated by the heater core 42.

As a result, in the vehicle air conditioner 1 in the sole cool down mode, the battery side heat medium cooled by the chiller 19 flows into the heat exchange unit 52 of the battery side heat medium circuit 50 without air conditioning the interior of the vehicle, and allows the battery 80 to be cooled.

(5) Cooling and Cool Down Mode

In the cooling and cool down mode, the heating expansion valve 14a is fully opened, and the cooling expansion valve 14b and the cool down expansion valve 14c are each adjusted to throttle opening degrees determined in the cooling and cool down mode. Further, the dehumidifying on-off valve 15a is closed, and the heating on-off valve 15b is closed.

Further, the controller 60 stops the operation of the high temperature side heat medium pump 41 so that the amount of heat radiated from the refrigerant heat exchanger 12 and the heater core 42 constituting the heating unit is minimized. Further, the controller 60 controls the operation of the battery side heat medium pump 51 so as to exert a predetermined heat medium pumping capacity for the cooling and cool down mode.

Therefore, in the refrigeration cycle device 10 in the cooling and cool down mode, a vapor compression refrigeration circuit is formed. In the cooling and cool down mode, the refrigerant flows, in order, through the compressor 11, the water-refrigerant heat exchanger 12, (the heating expansion valve 14a), the outside heat exchanger 16, the check valve 17, the cooling expansion valve 14b, the inside evaporator 18, the evaporation pressure adjusting valve 20, the accumulator 21, and then back to the compressor 11. At the same time, the refrigerant flows, in order, through the compressor 11, the water-refrigerant heat exchanger 12, (the heating expansion valve 14a), the outside heat exchanger 16, the check valve 17, the cool down expansion valve 14c, the chiller 19, the evaporation pressure adjusting valve 20, the accumulator 21, and then back to the compressor 11.

That is, the refrigeration cycle device 10 in the cooling and cool down mode is switched to a refrigerant circuit in which the path through which the refrigerant flows in order through the cooling expansion valve 14b and the inside evaporator 18 and the path through which the refrigerant flows in order through the cool down expansion valve 14c and the chiller 19 are connected in parallel to each other with respect to the flow of refrigerant.

With this circuit configuration, the controller 60 appropriately controls the operation of each control target device. For example, for the compressor 11, its rotation speed (that is, its refrigerant discharge capacity) is controlled so that the evaporator temperature Tefin detected by the evaporator temperature sensor 66 approaches the target evaporator temperature TEO.

The target evaporator temperature TEO is determined based on the target blowout temperature TAO with reference to a control map stored in advance in the controller 60. In this control map, it is determined that the target evaporator temperature TEO decreases as the target blowout temperature TAO decreases.

Further, with respect to the cooling expansion valve 14b, its throttle opening degree is controlled so that the sub cool degree SC of the refrigerant flowing out from the refrigerant passage of the outside heat exchanger 16 approaches the target sub cool degree SCO.

The degree of sub cool SC is calculated from the temperature T3 detected by the third refrigerant temperature sensor 64c and the pressure P1 detected by the first refrigerant pressure sensor 65a. The target sub cool degree SCO is determined based on the outside air temperature Tam with reference to the control map stored in the controller 60 in advance. In this control map, the target sub cool degree SCO is determined so that the coefficient of performance (COP) of the cycle is maximized.

Further, with respect to the cool down expansion valve 14c, the throttle opening degree of the cool down expansion valve 14c is controlled so that the superheat degree SHC of the refrigerant flowing out from the refrigerant passage of the chiller 19 approaches the target superheat degree SHCO.

The degree of superheat SHC is calculated from the temperature T3 detected by the third refrigerant temperature sensor 64c and the pressure P2 detected by the second refrigerant pressure sensor 65b. As the target superheat degree SHCO, a predetermined constant (5° C. in this embodiment) can be adopted.

The target battery side heat medium temperature TWCO is determined based on the battery temperature TB with reference to a control map stored in advance in the controller 60. In this control map, it is determined that the target battery side heat medium temperature TWCO is lower as the battery temperature TB is higher. At this time, in the cooling and cool down mode, the target battery side heat medium temperature TWCO is determined to be lower than the temperature of the battery side heat medium flowing into the water passage of the chiller 19.

Further, the actuator for the air mix door is controlled so that the opening degree SW is 0%. That is, the cold air bypass passage 35 is fully opened, and the air passage on the heater core 42 side is fully closed.

That is, in the cooling and cool down mode, the outside heat exchanger 16 functions as a radiator, and the inside evaporator 18 and the chiller 19 function as evaporators.

According to this, in the vehicle air conditioner 1 in the cooling and cool down mode, the ventilation air can be cooled by the inside evaporator 18. That is, it is possible to cool the interior of the vehicle by blowing out the ventilation air whose temperature has been adjusted so as to approach the target blowing temperature TAO into the vehicle interior.

Further, in the vehicle air conditioner 1 in the cooling and cool down mode, the battery side heat medium can be cooled by the chiller 19, so that the cooled battery side heat medium is allowed to flow into the heat exchange unit 52 to allow the battery 80 to be cooled, thereby cooling down the battery 80.

(6) Series Dehumidifying and Heating, and Cool Down Mode

In the series dehumidification and heating, and cool down mode, the heating expansion valve 14a is fully opened, and the cooling expansion valve 14b and the cool down expansion valve 14c are each adjusted to throttle opening degrees determined in the series dehumidification and heating, and cool down mode. Further, the dehumidifying on-off valve 15a is closed, and the heating on-off valve 15b is closed.

Further, the controller 60 controls the operation of the high temperature side heat medium pump 41 and the battery side heat medium pump 51 so as to exert predetermined heat medium pumping capacities for the series dehumidification and heating, and cool down mode. Here, the heat medium pumping capacity of the high temperature side heat medium pump 41 is controlled to be lower than the heat medium pumping capacity of the high temperature side heat medium pump 41 in the sole heating mode.

That is, the amount of heat radiated from the refrigerant heat exchanger 12 and the heater core 42 constituting the heating unit is controlled to be lower than that of the sole heating mode. As a control method for lowering the heat medium pumping capacity of the high temperature side heat medium pump 41, the rotation speed of the high temperature side heat medium pump 41 may be lowered or controlled so as to operate intermittently.

Accordingly, in the series dehumidification and heating, and cool down mode, the refrigerant flows, in order, through the compressor 11, the water-refrigerant heat exchanger 12, (the heating expansion valve 14a), the outside heat exchanger 16, the check valve 17, the cooling expansion valve 14b, the inside evaporator 18, the evaporation pressure adjusting valve 20, the accumulator 21, and then back to the compressor 11. At the same time, a steam compression type refrigeration circuit is formed in which the refrigerant flows, in order, through the compressor 11, the water-refrigerant heat exchanger 12, (the heating expansion valve 14a), the outside heat exchanger 16, the check valve 17, the cool down expansion valve 14c, the chiller 19, the evaporation pressure adjusting valve 20, the accumulator 21, and then back to the compressor 11.

That is, in the refrigeration cycle device 10 in the series dehumidification and heating, and cool down mode, after the refrigerant flows in order through the water-refrigerant heat exchanger 12, the heating expansion valve 14a, and the outside heat exchanger 16, two paths are connected in parallel with respect to the refrigerant flow. The two paths are a path in which the refrigerant flows in order through the cooling expansion valve 14b and the inside evaporator 18, and a path in which the refrigerant flows in order through the cool down expansion valve 14c and the chiller 19.

In the series dehumidification and heating, and cool down mode, the water-refrigerant heat exchanger 12 and the outside heat exchanger 16 function as radiators, and the inside evaporator 18 and the chiller 19 function as evaporators.

With this circuit configuration, the controller 60 appropriately controls the operation of each of the various control target devices, as in the cooling and cool down mode. The opening degree SW of the air mix door 34 is determined in the same manner as in the sole series dehumidifying and heating mode.

Further, in the series dehumidification and heating, and cool down mode, the high temperature side heat medium pump 41 is operated to circulate the high temperature side heat medium in the high temperature side heat medium circuit 40. As a result, the heat from the discharged refrigerant is dissipated into the high temperature side heat medium in the water-refrigerant heat exchanger 12.

By controlling the opening degree SW of the air mix door 34, the ventilation air cooled by the inside evaporator 18 passes through the heater core 42 of the high temperature side heat medium circuit 40. As a result, the ventilation air heated by the heat of the high temperature side heat medium in the heater core 42.

Therefore, in the vehicle air conditioner 1 in the series dehumidification and heating, and cool down mode, the ventilation air which is cooled and dehumidified by the inside evaporator 18 is reheated by the heater core 42 and blown out into the vehicle interior to dehumidify and heat the vehicle interior. At this time, the heating capacity of the ventilation air in the heater core 42 can be improved by controlling the throttle opening degrees of the heating expansion valve 14a and the cooling expansion valve 14b as in the sole series dehumidifying and heating mode.

Further, in the vehicle air conditioner 1 in the series dehumidification and heating, and cool down mode, the battery side heat medium can be cooled by the chiller 19, so that the cooled battery side heat medium is allowed to flow into the heat exchange unit 52 to allow the battery 80 to be cooled, thereby cooling down the battery 80, while also providing dehumidification and heating.

(7) Parallel Dehumidifying and Heating, and Cool Down Mode

In the parallel dehumidification and heating, and cool down mode, the heating expansion valve 14a, the cooling expansion valve 14b, and the cool down expansion valve 14c are each adjusted to throttle opening degrees determined in the parallel dehumidification and heating, and cool down mode. Further, the dehumidifying on-off valve 15a is opened, and the heating on-off valve 15b is opened.

Further, the controller 60 controls the operation of the high temperature side heat medium pump 41 and the battery side heat medium pump 51 so as to exert predetermined heat medium pumping capacities for the parallel dehumidification and heating, and cool down mode.

Here, the heat medium pumping capacity of the high temperature side heat medium pump 41 in the parallel dehumidification and heating, and cool down mode is controlled to be lower than the heat medium pumping capacity of the high temperature side heat medium pump 41 in the sole heating mode. That is, the amount of heat radiated from the refrigerant heat exchanger 12 and the heater core 42 constituting the heating unit is controlled to be lower than that of the sole heating mode.

Therefore, in the parallel dehumidifying and heating, and cool down mode, the refrigerant circulates, in this order, through the compressor 11, the water-refrigerant heat exchanger 12, the heating expansion valve 14a, the outside heat exchanger 16, the heating passage 22b, the accumulator 21, and then back to the compressor 11. At the same time, the refrigerant circulates, in this order, through the compressor 11, the water-refrigerant heat exchanger 12, the bypass passage 22a, the cooling expansion valve 14b, the inside evaporator 18, the evaporation pressure adjusting valve 20, the accumulator 21, and the compressor 11. Further in addition to this and in parallel, a steam compression type refrigeration circuit is formed in which the refrigerant circulates, in this order, through the compressor 11, the water-refrigerant heat exchanger 12, the bypass passage 22a, the cool down expansion valve 14c, the chiller 19, the evaporation pressure adjusting valve 20, the accumulator 21, and the compressor 11.

That is, in the refrigeration cycle device 10 in the parallel dehumidifying and heating, and cool down mode, after the refrigerant flows from the water-refrigerant heat exchanger 12, it branches into three refrigerant paths. That is, the path through which the refrigerant flows in order through the heating expansion valve 14a and the outside heat exchanger 16, the path through which the refrigerant flows in order through the cooling expansion valve 14b and the inside evaporator 18, and the path through which the refrigerant flows in order through the cool down expansion valve 14c and the chiller 19 are connected in parallel to each other with respect to the flow of refrigerant.

In the parallel dehumidifying and heating, and cool down mode, the water-refrigerant heat exchanger 12 functions as a radiator, and the outside heat exchanger 16, the inside evaporator 18, and the chiller 19 connected in parallel with respect to refrigerant flow function as evaporators.

With this circuit configuration, the controller 60 appropriately controls the operation of each of the various control target devices, as in the cooling and cool down mode. The opening degree SW of the air mix door 34 is determined in the same manner as in the sole parallel dehumidifying and heating mode.

Then, in the parallel dehumidifying and heating, and cool down mode, the high temperature side heat medium pump 41 is operated to circulate the high temperature side heat medium in the high temperature side heat medium circuit 40, and the opening degree SW of the air mix door 34 is controlled. As a result, the ventilation air cooled by the inside evaporator 18 passes through the heater core 42 of the high temperature side heat medium circuit 40.

Therefore, in the vehicle air conditioner 1 in the parallel dehumidification and heating, and cool down mode, the ventilation air which is cooled and dehumidified by the inside evaporator 18 is reheated by the heater core 42 and blown out into the vehicle interior to dehumidify and heat the vehicle interior.

At this time, by lowering the refrigerant evaporation temperature in the outside heat exchanger 16 to be below the refrigerant evaporation temperature in the inside evaporator 18, the ventilation air can be reheated with a heating capacity higher than that in the series dehumidifying and heating, and cool down mode.

Further, the vehicle air conditioner 1 in the parallel dehumidifying and heating, and cool down mode can cool down the battery 80 by causing the battery side heat medium, which is cooled by the chiller 19, to flow into the heat exchange unit 52.

(11) First Heating and Cool Down Mode

In the first heating and cool down mode, the heating expansion valve 14a and the cool down expansion valve 14c are each adjusted to throttle openings defined in the first heating and cool down mode, and the cooling expansion valve 14b is fully closed. Further, the dehumidifying on-off valve 15a is closed, and the heating on-off valve 15b is closed.

Further, the controller 60 controls the operation of the high temperature side heat medium pump 41 and the battery side heat medium pump 51 so as to exert predetermined heat medium pumping capacities for the first heating and cool down mode. Here, the heat medium pumping capacity of the high temperature side heat medium pump 41 is controlled to be equal to the heat medium pumping capacity of the high temperature side heat medium pump 41 in the sole heating mode.

Therefore, in the first heating and cool down mode, a vapor compression refrigeration cycle is formed. In the first heating and cool down mode, the refrigerant flows, in order, through the compressor 11, the water-refrigerant heat exchanger 12, the heating expansion valve 14a, the outside heat exchanger 16, the check valve 17, the cool down expansion valve 14c, the chiller 19, the evaporation pressure adjusting valve 20, the accumulator 21, and then back to the compressor 11.

With this circuit configuration, the controller 60 appropriately controls the operation of each control target device. For example, with respect to the compressor 11, the rotation speed of the compressor 11 is controlled so that the high temperature side heat medium temperature TWH approaches the target high temperature side heat medium temperature TWHO.

The target high temperature side heat medium temperature TWHO is determined based on the target blowout temperature TAO with reference to a control map stored in advance in the controller 60. In this control map, it is determined that the target high temperature side heat medium temperature TWHO is increased as the target blowout temperature TAO increases, so that the temperature of the ventilation air blown into the vehicle interior approaches the target blowout temperature TAO.

A throttle opening EX1 of the heating expansion valve 14a and a throttle opening EX2 of the cool down expansion valve 14c are controlled such that the sub cool degree SC of the refrigerant flowing out from the refrigerant passage of the water-refrigerant heat exchanger 12 approaches the target sub cool degree SCO.

Further, the throttle opening degrees of the heating expansion valve 14a and the cool down expansion valve 14c are defined such that as the target blowout temperature TAO rises, the throttle opening degree of the heating expansion valve 14a is reduced and the throttle opening degree of the cool down expansion valve 14c is increased.

Further, the actuator for the air mix door is controlled in the same manner as in the sole cooling mode. Here, in the first heating and cool down mode, the target blowout temperature TAO is relatively high, so that the opening degree SW of the air mix door 34 approaches 100%. Therefore, in the first heating and cool down mode, the air mix door 34 is displaced so that approximately the entire flow amount of the blown air after passing through the inside evaporator 18 passes through the heater core 42.

That is, in the first heating and cool down mode, the water-refrigerant heat exchanger 12 functions as a radiator and the chiller 19 functions as an evaporator. According to this, the battery 80 can be cooled via the battery side heat medium in the chiller 19, and the ventilation air can be heated via the water-refrigerant heat exchanger 12 and the heater core 42. Therefore, in the vehicle air conditioner 1 in the first heating and cool down mode, the heating of the vehicle interior and the cooling of the battery 80 can be performed in parallel.

In this first heating and cool down mode, a cool down priority mode and a heating priority mode can be executed. In the cool down priority mode, the outside heat exchanger 16 functions as a radiator, and among the two functions of heating the vehicle interior and cooling the battery 80, the cooling of the battery 80 is prioritized. In the heating priority mode, the outside heat exchanger 16 functions as a heat absorber, and among the two functions of heating the vehicle interior and cooling the battery 80, the heating the vehicle interior is prioritized.

The cool down priority mode and the heating priority mode in the first heating and cool down mode can be switched by controlling the throttle opening degree EX1 of the heating expansion valve 14a and the throttle opening degree EX2 of the cool down expansion valve 14c. Specifically, the switching is performed by adjusting an opening degree ratio EX1/EX2 between the throttle opening degree EX1 of the heating expansion valve 14a with respect to the throttle opening degree EX2 of the cool down expansion valve 14c.

In the cool down priority mode, the controller 60 increases the throttle opening degree EX1 of the heating expansion valve 14a and decreases the throttle opening degree EX2 of the cool down expansion valve 14c. That is, the opening degree ratio EX1/EX2 is adjusted to be relatively high. As a result, the saturation temperature of the refrigerant in the outside heat exchanger 16 becomes higher than the outside air temperature Tam, so that the outside heat exchanger 16 functions as a radiator with respect to the outside air.

Figure 5:
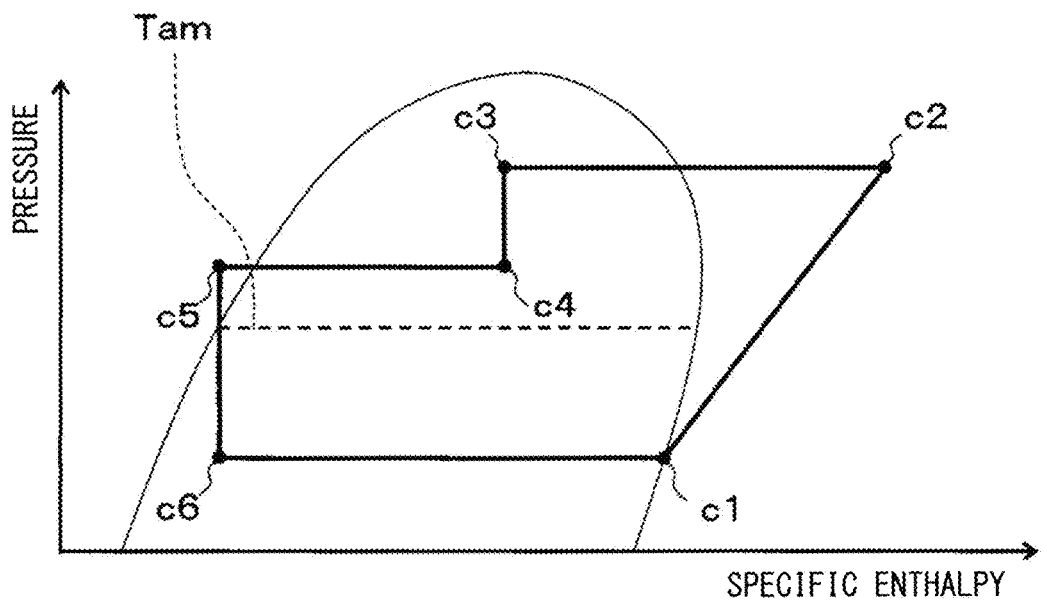
FIG. 5 is a Mollier diagram showing changes in the state of a refrigerant in a cooling priority mode of a first heating and cool down mode of the refrigeration cycle device according to the embodiment.

Therefore, in the refrigeration cycle device 10 in the cool down priority mode in the first heating and cool down mode, the state of the refrigerant changes as shown in the Mollier diagram shown in FIG. 5. That is, as shown at points c1 to c2 in FIG. 5, the refrigerant sucked into the compressor 11 is discharged in a state of being compressed to a high temperature and a high pressure.

The high pressure refrigerant discharged from the compressor 11 flows into the refrigerant passage of the water-refrigerant heat exchanger 12. Here, in the first heating and cool down mode, since the high temperature side heat medium pump 41 is operating, as shown at points c2 to c3 in FIG. 5, the discharged refrigerant exchanges heat with the high temperature side heat medium flowing through the water passage of the water-refrigerant heat exchanger 12 to dissipate heat. As a result, the high temperature side heat medium flowing through the water passage of the water-refrigerant heat exchanger 12 is heated.

In the high temperature side heat medium circuit 40, the high temperature side heat medium heated in the water passage of the water-refrigerant heat exchanger 12 exchanges heat with the ventilation air in the heater core 42 to dissipate heat. As a result, the temperature of the ventilation air blown into the vehicle interior approaches the target blowout temperature TAO. The high temperature side heat medium flowing out of the heater core 42 is sucked into the high temperature side heat medium pump 41 via the high temperature side three way valve 43, and is pumped back to the water passage of the water-refrigerant heat exchanger 12.

The refrigerant flowing out of the refrigerant passage of the water-refrigerant heat exchanger 12 reaches the heating expansion valve 14a without flowing into the bypass passage 22a, and is pressure reduced as shown at points c3 to c4 in FIG. 5. In the cool down priority mode of the first heating and cool down mode, the saturation temperature of the refrigerant pressure reduced by the heating expansion valve 14a becomes higher than the outside air temperature Tam. Therefore, as shown at points c4 to c5 in FIG. 5, the refrigerant pressure reduced by the heating expansion valve 14a exchanges heat with the outside air in the outside heat exchanger 16 to dissipate heat.

Then, the refrigerant flowing out of the outside heat exchanger 16 flows into the cool down expansion valve 14c because the cooling expansion valve 14b is in the fully closed state. As shown at points c5 to c6 in FIG. 5, the refrigerant is pressure reduced by the cool down expansion valve 14c.

The refrigerant flowing out of the cool down expansion valve 14c flows into the refrigerant passage of the chiller 19. The refrigerant passing through the refrigerant passage of the chiller 19 evaporates by exchanging heat with the battery side heat medium flowing through the water passage of the chiller 19, as shown at points c6 to c1 in FIG. 5. As a result, the battery side heat medium flowing through the water passage of the chiller 19 is cooled. Here, in the battery side heat medium circuit 50, since the battery side heat medium pump 51 is operating, the battery side heat medium and the battery 80 exchange heat in the heat exchange unit 52 to cool the battery 80.

The refrigerant flowing out of the refrigerant passage of the chiller 19 flows into the accumulator 21 via the sixth three way joint 13f and the evaporation pressure adjusting valve 20. The gas phase refrigerant separated by the accumulator 21 is sucked into the compressor 11 and compressed again, as shown at point c1 in FIG. 5.

As described above, in the refrigeration cycle device 10 in the cool down priority mode in the first heating and cool down mode, a refrigeration circuit is formed in which the water-refrigerant heat exchanger 12 and the outside heat exchanger 16 function as radiators, and the chiller 19 functions as an evaporator. That is, since the refrigerant also dissipates heat in the outside heat exchanger 16, the amount of heat dissipated by the refrigerant in the water-refrigerant heat exchanger 12 is smaller than in the heating priority mode. In other words, the cooling of the battery 80 can be prioritized as compared with the heating of the vehicle interior.

Conversely, in the heating priority mode of the first heating and cool down mode, the controller 60 decreases the throttle opening degree EX1 of the heating expansion valve 14a and increases the throttle opening degree EX2 of the cool down expansion valve 14c. That is, the opening degree ratio EX1/EX2 is adjusted to be relatively low. As a result, the saturation temperature of the refrigerant in the outside heat exchanger 16 becomes lower than the outside air temperature Tam, so that the outside heat exchanger 16 functions as a heat absorber with respect to the outside air.

Figure 6:
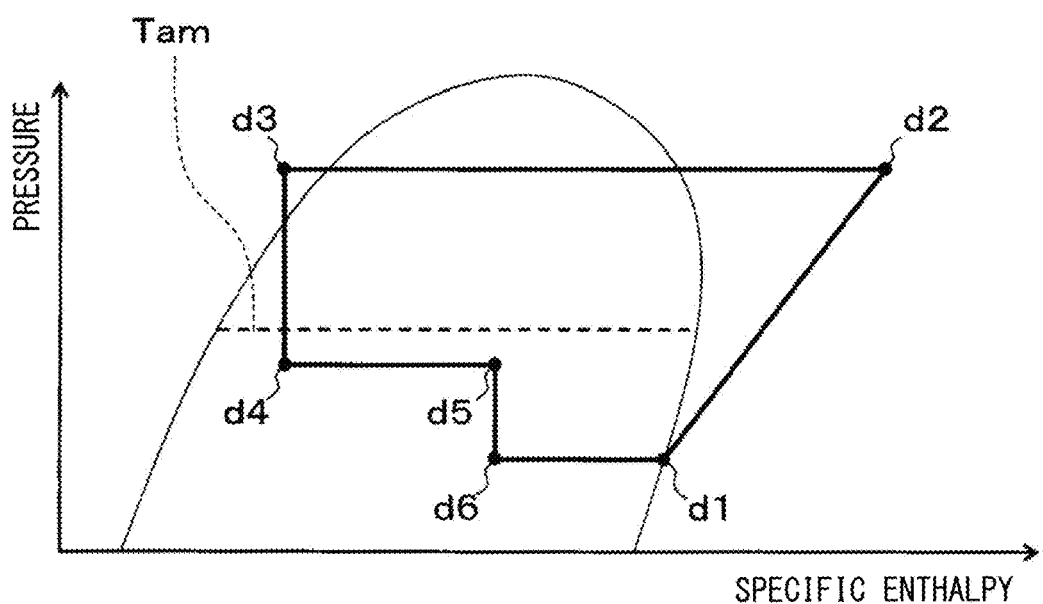
FIG. 6 is a Mollier diagram showing changes in the state of a refrigerant in a heating priority mode of a first heating and cool down mode of the refrigeration cycle device according to the embodiment.

Therefore, in the refrigeration cycle device 10 in the heating priority mode in the first heating and cool down mode, the state of the refrigerant changes as shown in the Mollier diagram shown in FIG. 6. That is, as shown at points d1 to d2 in FIG. 6, the refrigerant sucked into the compressor 11 is discharged in a state of being compressed to a high temperature and a high pressure.

The high pressure refrigerant discharged from the compressor 11 flows into the refrigerant passage of the water-refrigerant heat exchanger 12. Here, in the first heating and cool down mode, since the high temperature side heat medium pump 41 is operating, as shown at points d2 to d3 in FIG. 6, the discharged refrigerant exchanges heat with the high temperature side heat medium flowing through the water passage of the water-refrigerant heat exchanger 12 to dissipate heat. As a result, the high temperature side heat medium flowing through the water passage of the water-refrigerant heat exchanger 12 is heated.

In the high temperature side heat medium circuit 40, the ventilation air is heated by the heater core 42 as in the cool down priority mode in the first heating and cool down mode. As a result, the temperature of the ventilation air blown into the vehicle interior approaches the target blowout temperature TAO.

The refrigerant flowing out of the refrigerant passage of the water-refrigerant heat exchanger 12 reaches the heating expansion valve 14a without flowing into the bypass passage 22a, and is pressure reduced as shown at points d3 to d4 in FIG. 6. In the heating priority mode of the first heating and cool down mode, the saturation temperature of the refrigerant pressure reduced by the heating expansion valve 14a becomes lower than the outside air temperature Tam. Therefore, as shown at points d4 to d5 in FIG. 6, the refrigerant pressure reduced by the heating expansion valve 14a exchanges heat with the outside air in the outside heat exchanger 16 to absorb heat from the outside air.

Then, the refrigerant flowing out of the outside heat exchanger 16 flows into the cool down expansion valve 14c because the cooling expansion valve 14b is in the fully closed state. As shown at points d5 to d6 in FIG. 6, the refrigerant is pressure reduced by the cool down expansion valve 14c.

The refrigerant flowing out of the cool down expansion valve 14c flows into the refrigerant passage of the chiller 19. The refrigerant passing through the refrigerant passage of the chiller 19 evaporates by exchanging heat with the battery side heat medium flowing through the water passage of the chiller 19, as shown at points d6 to d1 in FIG. 6. As a result, the battery side heat medium flowing through the water passage of the chiller 19 is cooled. Here, in the battery side heat medium circuit 50, since the battery side heat medium pump 51 is operating, the battery side heat medium and the battery 80 exchange heat in the heat exchange unit 52 to cool the battery 80.

The refrigerant flowing out of the refrigerant passage of the chiller 19 flows into the accumulator 21 via the sixth three way joint 13f and the evaporation pressure adjusting valve 20. The gas phase refrigerant separated by the accumulator 21 is sucked into the compressor 11 and compressed again, as shown at point d1 in FIG. 6.

As described above, in the refrigeration cycle device 10 in the heating priority mode in the first heating and cool down mode, the water-refrigerant heat exchanger 12 functions as a radiator, and the outside heat exchanger 16 and the chiller 19 function as heat absorbers.

As a result, the amount of heat absorbed from the refrigerant in the outside heat exchanger 16 can be increased, the amount of heat released from the refrigerant in the water-refrigerant heat exchanger 12 can be increased, and the heating capacity of the ventilation air by the heater core 42 can be improved. That is, according to the heating priority mode in the first heating and cool down mode, the heating of the vehicle interior can be prioritized as compared with the cooling of the battery 80.

(12) Second Heating and Cool Down Mode

In the second heating and cool down mode, the cool down expansion valve 14c is adjusted to a throttle opening degree determined in the second heating and cool down mode, and the heating expansion valve 14a and the cooling expansion valve 14b are fully closed. The dehumidifying on-off valve 15a is opened, and the heating on-off valve 15b is closed.

Further, the controller 60 controls the operation of the high temperature side heat medium pump 41 and the battery side heat medium pump 51 so as to exert predetermined heat medium pumping capacities for the second heating and cool down mode. Here, the heat medium pumping capacity of the high temperature side heat medium pump 41 is controlled to be equal to the heat medium pumping capacity of the high temperature side heat medium pump 41 in the sole heating mode.

Accordingly, in the second heating and cool down mode, a steam compression type refrigeration circuit is formed in which the refrigerant circulates, in this order, through the compressor 11, the water-refrigerant heat exchanger 12, the bypass passage 22a, the cool down expansion valve 14c, the chiller 19, the evaporation pressure adjusting valve 20, the accumulator 21, and the compressor 11.

With this circuit configuration, the controller 60 appropriately controls the operation of each control target device. For example, with respect to the compressor 11, the rotation speed of the compressor 11 is controlled so that the high temperature side heat medium temperature TWH approaches the target high temperature side heat medium temperature TWHO.

The target high temperature side heat medium temperature TWHO is determined by referring to the control map stored in the controller 60 in advance, as in the first heating and cool down mode. The throttle opening degree of the cool down expansion valve 14c is controlled so that the sub cool degree SC of the refrigerant flowing out from the refrigerant passage of the water-refrigerant heat exchanger 12 approaches the target sub cool degree SCO.

Further, the actuator for the air mix door is controlled in the same manner as in the sole cooling mode. Here, in the second heating and cool down mode, the target blowout temperature TAO is relatively high, so that the opening degree SW of the air mix door 34 approaches 100%.

That is, in the second heating and cool down mode, the water-refrigerant heat exchanger 12 functions as a radiator and the chiller 19 functions as an evaporator. According to this, the battery 80 can be cooled via the battery side heat medium in the chiller 19, and the ventilation air can be heated via the water-refrigerant heat exchanger 12 and the heater core 42. Therefore, in the vehicle air conditioner 1 in the second heating and cool down mode, the heating of the vehicle interior and the cooling of the battery 80 can be performed in parallel.

Here, in the vehicle air conditioner 1, the outside heat exchanger 16 is arranged on the front side of the drive device compartment. As such, outside air, such as wind which enters the drive device compartment as the vehicle is travelling, exchanges heat with the refrigerant flowing inside the outside heat exchanger 16.

Since there are many gaps in the drive device compartment, it is difficult to control the amount of outside air passing through the outside heat exchanger 16. As a result, even if a shutter device is arranged between the front grill where wind is introduced and the outside heat exchanger 16, it is difficult to accurately control the amount of outside air passing through the outside heat exchanger 16. Further, the outside air that exchanges heat with the refrigerant flowing inside the outside heat exchanger 16 changes due to external factors such as the weather surrounding the vehicle.

That is, when the vehicle air conditioner 1 adopts a refrigerant circuit configuration in which the refrigerant passes through the outside heat exchanger 16, there is a possibility of the heat exchange with outside air in the outside heat exchanger 16 affecting the air conditioning in the vehicle interior and the cooling of the battery 80.

In this regard, in the vehicle air conditioner 1 in the second heating and cool down mode, the refrigerant flowing out of the water-refrigerant heat exchanger 12 is guided to the cool down expansion valve 14c via the bypass passage 22a while bypassing the heating expansion valve 14a and the outside heat exchanger 16. According to this configuration, the influence of heat exchange with the outside air in the outside heat exchanger 16 can be reduced, and the heating of the vehicle interior and the cooling of the battery 80 can be controlled with high accuracy.

Here, in the vehicle air conditioner 1 according to the present embodiment, the temperatures of the high temperature side heat medium and the battery side heat medium are controlled in advance in order to cope with increases in required heat capacity when switching of operation modes. By performing this control process, it is possible avoid insufficient heat capacity when switching of operation modes, and disturbances to the air conditioning of the vehicle interior and the temperature adjustment of the battery 80 can be reduced.

An example of this control process will be described for when switching from the sole heating mode to the heating and warm up mode. Here, as a situation in which the sole heating mode is used as the operation mode of the vehicle air conditioner 1, it is conceivable that the battery 80 is rapidly charged with the occupant inside the vehicle with an extremely low outside air temperature.

When the battery 80 is being rapidly charged, the amount of heat generated by the battery 80 is relatively high. Accordingly, it is not necessary to warm up the battery 80 even with a low outside temperature. However, after the rapid charging is completed, it is necessary to warm up the battery 80 while the vehicle is in motion.

Therefore, according to the refrigeration cycle device 10 of the present embodiment, when the rapid charging of the battery 80 is started in a state where heating of the vehicle interior is required, the sole heating mode is performed. After that, when the quick charging is completed, the operation mode is switched from the sole heating mode to the heating and warm up mode.

When the remaining charge of the battery 80 becomes larger than a predetermined reference charge remaining amount (that is, immediately before the completion of quick charging), the target high temperature side heat medium temperature TWHO is raised. In other words, in the refrigeration cycle device 10 of the present embodiment, it is determined that a predetermined heating switching condition is satisfied when the rapid charging of the battery 80 is started in the state where the heating of the vehicle interior is requested.

Then, when the heating switching condition is satisfied, the target high temperature side heat medium temperature TWHO is raised to raise the temperature of the high temperature side heat medium before switching from the sole heating mode to the heating and warm up mode.

When switching from the sole heating mode to the heating and warm up mode, instead of only heating the vehicle interior, the battery 80 will also be warmed up as well. As a result, there is a risk of insufficient heating capacity for heating the vehicle interior during the heating and warm up mode.

According to the vehicle air conditioner 1, when the heating switching condition is satisfied, heat energy can be stored in the high temperature side heat medium circuit 40 by raising the temperature of the high temperature side heat medium. As a result, when switching to the heating and warm up mode, the vehicle air conditioner 1 can reduce the influence of the warming of the battery 80 with respect to the heating of the vehicle interior (that is, reduce temperature fluctuations of the ventilation air during heating).

Next, the control process when switching from the sole warm up mode to the heating and warm up mode will be described. As described above, the refrigeration cycle device 10 of the present embodiment can perform pre air conditioning.

The pre air conditioning is executed by an occupant operating the operation panel 70 or a remote control terminal so that the target temperature Tset in the vehicle interior and a pre air conditioning start time and the like are stored in the controller 60. The pre air conditioning start time is a time when the time when the occupant gets on is approaching and there is a high possibility that the vehicle will be driven in a relatively near future.

Therefore, in the refrigeration cycle device 10, if the pre air conditioning is set, the sole warm up mode is executed when the battery temperature TB is equal to or lower than the reference lower limit temperature KTBL at a predetermined amount of time prior to the pre air conditioning start time (for example, 10 minutes prior). After that, when the pre air conditioning start time arrives, the operation mode of the vehicle air conditioner 1 is switched from the sole warm up mode to the heating and warm up mode.

Here, before switching from the sole warm up mode to the heating and warm up mode (for example, one minute prior to the switching), the target battery side heat medium temperature TWCO is raised. That is, in the refrigeration cycle device 10 of the present embodiment, it is determined that a predetermined warm up switching condition is satisfied when the pre air conditioning is set and the operation in the sole warm up mode is executed.

Then, when the warm up switching condition is satisfied, the target battery side heat medium temperature TWCO is raised to raise the temperature of the battery side heat medium before switching from the sole warm up mode to the heating and warm up mode.

When switching from the sole warm up mode to the heating and warm up mode, instead of only warming up the battery 80, pre air conditioning is performed in the passenger compartment in addition to warming up the battery 80. Accordingly, there is a risk of an insufficient heating capacity required to warm up the battery 80 in the heating and warm up mode.

According to the vehicle air conditioner 1, when the warm up switching condition is satisfied, the temperature of the battery side heat medium can be raised so that heat energy can be stored in the battery side heat medium circuit 50. Accordingly, the influence of the start of pre air conditioning with respect to the warm up of the battery 80 can be reduced.

As described above, according to the refrigeration cycle device 10 according to the present embodiment, the operation of the heating expansion valve 14a, the cooling expansion valve 14b, the cool down expansion valve 14c, the dehumidifying on-off valve 15a, and the heating on-off valve 15b can be controlled to switch the refrigerant circuit of the refrigeration cycle device 10. As a result, the refrigeration cycle device 10 can implement any one of 12 types of operation modes mentioned above, from the (1) sole cooling mode to the (12) second heating and cool down mode.

The refrigeration cycle device 10 can set the outside heat exchanger 16 to function as a radiator by setting the operation mode to the cooling and cool down mode, and can also set the inside evaporator 18 and the chiller 19, which is a temperature control heat exchanger, to function as heat absorbers. As a result, the refrigeration cycle device 10 can achieve both cooling of the vehicle interior and cooling of the battery 80, which is a temperature adjustment target, in the vehicle air conditioner 1.

Further, the refrigeration cycle device 10 can guide the discharged refrigerant discharged from the compressor 11 to the chiller 19 via the bypass passage 22a by switching operation mode. As a result, the refrigeration cycle device 10 can warm up the battery 80 in the vehicle air conditioner 1 using the heat of the discharged refrigerant as a heat source.

Further, the refrigeration cycle device 10 can improve the comfort in the vehicle interior and adjust the battery 80 within an appropriate temperature range by switching between these operation modes.

As shown in FIG. 1, the refrigeration cycle device 10 includes a high temperature side heat medium circuit 40 as a heating unit including a water-refrigerant heat exchanger 12, a heating expansion valve 14a, a heating on-off valve 15b, and a heating passage 22b. Therefore, the refrigeration cycle device 10 can heat the ventilation air by using the heat of the discharged refrigerant as a heat source in the heater core 42 of the high temperature side heat medium circuit 40, and the vehicle air conditioner 1 is able to heat the vehicle interior.

Further, in the sole warm up mode, by stopping the operation of the high temperature side heat medium pump 41 of the high temperature side heat medium circuit 40, the heat radiation amount of the discharged refrigerant in the water-refrigerant heat exchanger 12 is minimized, and as much heat as possible can be supplied to the chiller 19 from the heat in the discharged refrigerant. As a result, the refrigeration cycle device 10 can quickly warm up the battery 80 in the vehicle air conditioner 1.

Then, in the heating and warm up mode, the heat medium pumping capacity of the high temperature side heat medium pump 41 in the high temperature side heat medium circuit 40 is adjusted to be lower than that in the sole heating mode, so that the amount of heat released from the discharged refrigerant in the water-refrigerant heat exchanger 12 can be set to be lower than in the sole heating mode.

As a result, the refrigeration cycle device 10 is able to both heat the passenger compartment and warm up the battery 80 by heating of the ventilation air in the high temperature side heat medium circuit 40 and using the heat included in the discharged refrigerant to heat the battery 80 in the battery side heat medium circuit 50.

Further, in the first heating and cool down mode, a circuit is formed in which the refrigerant flows, in order, through the compressor 11, the water-refrigerant heat exchanger 12, the heating expansion valve 14a, the outside heat exchanger 16, the check valve 17, the cool down expansion valve 14c, the chiller 19, the evaporation pressure adjusting valve 20, the accumulator 21, and then back to the compressor 11.

Therefore, in the first heating and cool down mode, the refrigeration cycle device 10 can make the water-refrigerant heat exchanger 12 function as a radiator and the chiller 19 as a heat absorber. As a result, the refrigeration cycle device 10 can achieve both heating of the ventilation air in the high temperature side heat medium circuit 40 and cooling of the battery 80 in the battery side heat medium circuit 50.

Further, in the first heating and cool down mode, by adjusting the opening degree ratio EX1/EX2 of the throttle opening degree EX1 of the heating expansion valve 14a with respect to the throttle opening degree EX2 of the cool down expansion valve 14c, the outside heat exchanger 16 can function as either a radiator or a heat absorber.

During the first heating and cool down mode, in the cool down priority mode in which the outside heat exchanger 16 functions as a radiator, the water-refrigerant heat exchanger 12 and the outside heat exchanger 16 function as radiators, and the chiller 19 functions as a heat absorber. Therefore, the cooling of the battery 80 can be prioritized as compared with the heating of the vehicle interior.

Further, during the first heating and cool down mode, in the heating priority mode in which the outside heat exchanger 16 functions as a heat absorber, the water-refrigerant heat exchanger 12 functions as a radiator, while the outside heat exchanger 16 and the chiller 19 function as heat absorbers. Therefore, the heating of the vehicle interior can be prioritized as compared with the cooling of the battery 80.

As described above, in the first heating and cool down mode, the refrigeration cycle device 10 can switch the function of the outside heat exchanger 16 to change to either the cool down priority mode or the heating priority mode. As a result, it is possible to achieve both heating of the vehicle interior and cooling of the battery 80 in an appropriate manner according to the situation of the vehicle.

Further, in the second heating and cool down mode, a steam compression type refrigeration circuit is formed in which the refrigerant circulates, in this order, through the compressor 11, the water-refrigerant heat exchanger 12, the bypass passage 22a, the cool down expansion valve 14c, the chiller 19, the evaporation pressure adjusting valve 20, the accumulator 21, and the compressor 11.

That is, in the second heating and cool down mode, the water-refrigerant heat exchanger 12 functions as a radiator and the chiller 19 functions as a heat absorber. According to this, the battery 80 can be cooled via the battery side heat medium in the chiller 19, and the ventilation air can be heated via the water-refrigerant heat exchanger 12 and the heater core 42.

In this second heating and cool down mode, a circuit is formed in which the refrigerant flowing out from the water-refrigerant heat exchanger 12 passes through the bypass passage 22a and flows into the cool down expansion valve 14c. As a result, the outside heat exchanger 16 is bypassed. Accordingly, in the refrigeration cycle device 10, the influence of heat exchange with the outside air in the outside heat exchanger 16 can be reduced, and the heating of the vehicle interior and the cooling of the battery 80 can both be performed with high accuracy.

Further, in the refrigeration cycle device 10, when a heating switching condition is satisfied, the temperature of the high temperature side heat medium is raised before switching from the sole heating mode to the heating and warm up mode. According to this, the temperature of the high temperature side heat medium circulating in the high temperature side heat medium circuit 40 can be raised and heat energy can be stored in the high temperature side heat medium circuit 40 before switching to the heating and warm up mode.

According to this, when the sole heating mode is switched to the heating and warm up mode, the heat energy stored in the high temperature side heat medium circuit 40 is used to avoid a decrease in the heating capacity of the ventilation air, and at the same time, the battery 80 can be warmed up.

Further, in the refrigeration cycle device 10, when a warm up switching condition is satisfied, the temperature of the battery side heat medium is raised before switching from the sole warm up mode to the heating and warm up mode. As a result, the temperature of the battery side heat medium circulating in the battery side heat medium circuit 50 can be raised and heat energy can be stored in the battery side heat medium circuit 50 before switching to the heating and warm up mode.

According to this, when switching from the sole warm up mode to the heating and warm up mode, the heat stored in the battery side heat medium circuit 50 is used to reduce any decrease in the heating capacity of the battery 80 while also quickly heating the ventilation air.

That is, even if the heating capacity of the refrigeration cycle device 10 is used to heat the ventilation air when the sole warm up mode is switched to the heating and warm up mode, the heat stored in the battery side heat medium circuit 50 can be used to warm up the battery 80.

The present disclosure is not limited to the embodiments described above, and various modifications can be made as follows within a scope not departing from the spirit of the present disclosure.

In the above described embodiment, an example is described in which the refrigeration cycle device 10 according to the present disclosure is applied to a vehicle air conditioner 1 mounted on an electric vehicle, and the temperature adjustment target is a battery 80. The application target of the refrigeration cycle device is not limited to this.

For example, it may be applied to a vehicle air conditioner mounted on a hybrid vehicle that obtains a propulsion force from both an engine and an electric motor. Further, the temperature adjustment target is not limited to the battery 80, and may be an in vehicle device such as an inverter or a motor generator. Further, the application target of the present disclosure is not limited to the vehicle, and may be applied to an air conditioner having a server temperature adjusting function for inside air conditioning while appropriately adjusting the temperature of the computer server.

In the above described embodiment, the refrigeration cycle device 10 capable of switching to a plurality of operation modes has been described, but the switching of the operation mode is not limited to that disclosed in the above described embodiment.

At the very least, if operation in the cooling and cool down mode and the sole warm up mode can be performed, it is possible to obtain the effect of achieving both the improvement of the comfort of the passenger compartment by cooling and the realization of appropriate temperature adjustment of the temperature adjustment target.

Further, if the heating and warm up mode and the first heating and cool down mode or the second heating and cool down mode can be executed, it is possible to realize both appropriate temperature adjustment of the temperature adjustment target and to improve the comfort in the vehicle interior by heating.

The switching of each operation mode is not limited to the modes disclosed in each of the above described embodiments. For example, the operation panel 70 may be provided with a changeover switch so that each operation mode can be switched by the operation of the occupant.

The configuration of the refrigeration cycle device 10 is not limited to that disclosed in the above described embodiment. For example, as the heating expansion valve 14a, the cooling expansion valve 14b, and the cool down expansion valve 14c, an electric expansion valve having no fully closed function and an on-off valve directly connected to each other may be adopted. Further, a plurality of refrigerant circuit components may be integrated.

Further, in the above described embodiment, an example in which an electric variable throttle mechanism is adopted as the heating expansion valve 14a, the cooling expansion valve 14b, and the cool down expansion valve 14c has been described, but the present invention is not limited thereto. A fixed throttle or a temperature expansion valve may be adopted on the premise that it is combined with other constituent devices.

As the temperature type expansion valve, a mechanical mechanism may be used which includes a temperature sensitive portion having a deformable member (specifically, a diaphragm) that deforms according to the temperature and pressure of the refrigerant flowing from the refrigerant passage, and a valve body portion that changes a throttle opening degree when displaced according to the deformation of the deformable member.

In addition, in the embodiments described above, although R1234yf is employed as the refrigerant, the refrigerant is not limited to the above example. For example, R134a, R600a, R410A, R404A, R32, R407C, and the like may be employed. Alternatively, a mixed refrigerant or the like in which a plurality of types of these refrigerants are mixed may be adopted. Further, carbon dioxide may be employed as the refrigerant to configure a supercritical refrigeration cycle in which a high pressure side refrigerant pressure is equal to or higher than the critical pressure of the refrigerant.

Further, the control mode of the refrigeration cycle device 10 is not limited to those disclosed in the above described embodiments. For example, for the actuator for the air mix door, the operation may be controlled so that the ventilation air temperature TAV detected by the air conditioning air temperature sensor 69 approaches the target blowout temperature TAO.

In the above described embodiment, the heating unit composed of the water-refrigerant heat exchanger 12 and the components of the high temperature side heat medium circuit 40 is adopted, but the heating unit is not limited to this. For example, an inside condenser that directly exchanges heat between the high pressure refrigerant discharged from the compressor 11 and the blown air may be adopted, and the inside condenser may be arranged in the air conditioning case 31 in the same manner as the heater core 42.

Further, when the refrigeration cycle device 10 is applied to a vehicle air conditioner mounted on a hybrid vehicle, the engine cooling water may be allowed to flow into the high temperature side heat medium circuit 40 to be circulated. According to this, the ventilation air can be heated by the heater core 42 using the waste heat of the engine as a heat source.

Further, in the above described embodiment, the temperature adjusting unit composed of the constituent devices of the chiller 19 and the battery side heat medium circuit 50 is adopted, but the temperature adjusting unit is not limited to this. As the temperature adjusting unit, a temperature adjusting heat exchange unit that directly exchanges heat between the refrigerant flowing out of the cool down expansion valve 14c and the battery 80 may be adopted.

Further, as a temperature adjusting unit, a heat exchanger for heat exchange between the refrigerant flowing out from the cool down expansion valve 14c and the temperature adjusting ventilation air, and a temperature adjusting ventilation air blower that blows the temperature adjusting ventilation air whose temperature is adjusted by the heat exchanger to the battery 80 may be adopted.

Further, the high temperature side heat medium circuit 40 and the battery side heat medium circuit 50 described in the above described embodiment may be connected to each other via an on-off valve or the like so that the high temperature side heat medium and the battery side heat medium can be mixed.

In the above embodiment, one end side of the bypass passage 22a is connected to the refrigerant passage that connects the refrigerant outlet side of the water-refrigerant heat exchanger 12 to the inlet of the heating expansion valve 14a, while the other end side of the bypass passage 22a is connected to the refrigerant passage that connects the outlet side of the check valve 17 to the fifth three way joint 13e, but the present invention is not limited to this embodiment.

The bypass passage 22a can adopt various configurations as long as the discharged refrigerant discharged from the compressor 11 can be guided to the upstream side of the fifth three way joint 13e while bypassing the outside heat exchanger 16. For example, one end side of the bypass passage 22a may be connected to the refrigerant passage from the discharge port of the compressor 11 to the inlet of the refrigerant passage of the water-refrigerant heat exchanger 12.

Similarly, the connection structure of the heating passage 22b is not limited to the structure of the above described embodiment. The heating passage 22b may be implemented in various ways as long as the refrigerant flowing out of the outside heat exchanger 16 can be guided to the suction port side of the compressor 11 while bypassing the inside evaporator 18 and the chiller 19.

Although the present disclosure has been described in accordance with the examples, it is understood that the present disclosure is not limited to such examples or structures. The present disclosure encompasses various modifications and variations within the scope of equivalents. In addition, while the various combinations and configurations, which are preferred, other combinations and configurations, including more, less or only a single element, are also within the spirit and scope of the present disclosure.

The technical effects of the present disclosure may be more readily appreciated when contrasted with a comparative example device. The refrigeration cycle device of the comparative example device includes a heating unit that heats ventilation air blown into an air conditioning target space using high pressure refrigerant discharged from a compressor as a heat source, an inside evaporator that evaporates low pressure refrigerant to cool ventilation air, and a cooling unit that evaporates low pressure refrigerant to cool the battery.

Specifically, the heating unit is a high temperature side heat medium circuit in which a water-refrigerant heat exchanger is connected to a heater core. The water-refrigerant heat exchanger is configured to exchange heat between high pressure refrigerant and a high temperature side heat medium. The heater core is configured to heat ventilation air by exchanging heat between the high temperature side heat medium and the ventilation air.

The cooling unit is a battery side heat medium circuit in which a chiller is connected to a heat exchange unit. The chiller is configured to exchange heat between low pressure refrigerant and the battery side heat medium. The heat exchange unit is configured to exchange heat between the battery side heat medium and the secondary battery to cool the secondary battery.

In some cases, the temperature of the temperature adjustment target, whose temperature is adjusted by such a refrigeration cycle device, is preferably maintained within a predetermined temperature range. For example, the secondary battery of the comparative example device has a feature where output tends to decrease at low temperatures and deterioration tends to occur at high temperatures. Therefore, the temperature of the secondary battery needs to be maintained within an appropriate temperature range in which the charge and discharge capacity of the secondary battery can be fully utilized.

In this respect, the refrigeration cycle device of the comparative example device can cool the secondary battery in the cooling unit, but cannot warm up the secondary battery. Therefore, in the refrigeration cycle device of the comparative example device, there is a possibility that the secondary battery, which is the temperature adjustment target, cannot be appropriately temperature adjusted.

The present disclosure has been made in view of these points, and provides a refrigeration cycle device capable of achieving both appropriate temperature adjustment of the ventilation air blown to an air conditioned space and appropriate temperature adjustment of a temperature adjustment target.

That is, according to the refrigeration cycle device of the present disclosure and embodied by the above described exemplary embodiments, in the cooling and cool down mode, the heat of the discharged refrigerant discharged from the compressor is dissipated by the outside heat exchanger, and the refrigerant discharged from the outside heat exchanger is branched at the branch portion, one portion of which is pressure reduced by the cooling pressure reducing unit and heat can be absorbed from the ventilation air at the evaporator. Then, the other portion of refrigerant branched at the branch portion can be pressure reduced by the cool down pressure reducing unit and absorb heat from the temperature adjustment target object at the temperature adjusting unit.

Therefore, in the cooling and cool down mode, the refrigeration cycle device can supply the ventilation air cooled by the evaporator to the air conditioned space and cool the temperature adjustment target object at the temperature adjusting unit.

Further, according to the refrigeration cycle device, in the target warm up mode, the discharged refrigerant discharged from the compressor can be guided to the temperature adjusting heat exchange unit via the bypass passage. As a result, the refrigeration cycle device can heat and warm up the temperature adjustment target object using the heat of the discharged refrigerant as a heat source.

That is, the refrigeration cycle device adjusts the temperature of the ventilation air and heats or cools the temperature adjustment target object to achieve both air conditioning of the air conditioned space and appropriate temperature adjustment for the temperature adjustment target object.

The invention claimed is:

1. A refrigerant cycle device, comprising: a compressor that compresses and discharges a refrigerant; an outside heat exchanger that exchanges heat between the refrigerant discharged from the compressor and outside air; a cooling pressure reducing unit that reduces a pressure of the refrigerant that flowed out of the outside heat exchanger; an evaporator that evaporates the refrigerant that flowed out of the cooling pressure reducing unit and absorbs heat from ventilation air which is to be blown into an air conditioning target space; a branch portion connected so that a portion of the refrigerant flowing out of the outside heat exchanger branches from the flow toward the cool pressure reducing unit; a cool down pressure reducing unit that pressure reduces the refrigerant branched at the branch portion; a temperature adjusting unit that includes a temperature adjusting heat exchange unit which exchanges heat with the refrigerant that flowed out from the cool down pressure reducing unit, the temperature adjusting unit being configured to adjust a temperature of a temperature adjustment target object using the refrigerant that passed through the temperature adjusting heat exchange unit as a heat source; a merging portion that merges the flow of the refrigerant flowing out of the evaporator and the flow of the refrigerant flowing out of the temperature adjusting unit and guides the merged flow to a suction port side of the compressor; a bypass passage that guides the refrigerant discharged from the compressor to an upstream side of the branch portion while bypassing the outside heat exchanger; a first on-off valve arranged in the bypass passage and configured to open and close the bypass passage; a heating unit including a condenser for dissipating heat from the refrigerant discharged from the compressor and heating the ventilation air using the discharged refrigerant as a heat source; a heating pressure reducing unit that reduces a pressure of the refrigerant flowing out of the heating unit and guides the refrigerant to an inlet side of the outside heat exchanger; a heating passage that guides the refrigerant flowing out of the outside heat exchanger to the suction port side of the compressor while bypassing the evaporator and the temperature adjusting unit; and a second on-off valve arranged in the heating passage and configured to open and close the heating passage, wherein during a cooling and cool down mode for cooling the ventilation air and the temperature adjustment target object, the outside heat exchanger functions as a radiator, and the evaporator and the temperature adjusting heat exchange unit function as heat absorbers, during a target object warm up mode for heating the temperature adjustment target object, the refrigerant discharged from the compressor is guided to the temperature adjusting heat exchange unit via the bypass passage, and the heat of the discharged refrigerant is used as the heat source for heating the temperature adjustment target object, during the target object warm up mode, a heat radiation amount of the discharged refrigerant in the condenser of the heating unit is adjusted to a lowest state the heating unit has a pump that pumps a high temperature side heat medium to the condenser, the refrigerant cycle device further comprises a controller that controls the pump, and the controller is configured to adjust the heat radiation amount of the discharged refrigerant in the condenser of the heating unit to the lowest state by stopping the operation of the pump during the target object warm up mode.

2. The refrigerant cycle device of claim 1, wherein during the target object warm up mode, the heat radiation amount of the discharged refrigerant in the condenser of the heating unit is adjusted to be lower than that in a heating mode in which the ventilation air is heated by the heating unit and blown in to the air conditioning target space.

3. The refrigerant cycle device of claim 1, wherein during a first heating and cool down mode in which the first on-off valve is closed, the heating pressure reducing unit and the cool down pressure reducing unit each exert a refrigerant pressure reducing effect, the heating unit heats the ventilation air, and the temperature adjustment target object is cooled at the temperature adjusting unit: a cool down priority mode is performed in which a ratio of a throttle opening degree of the heating pressure reducing unit to a throttle opening degree of the cool down pressure reducing unit is increased so that the outside heat exchanger functions as the radiator, and a heating priority mode is performed in which the ratio of the throttle opening degree of the heating pressure reducing unit to the throttle opening degree of the cool down pressure reducing unit is decreased so that the outside heat exchanger functions as a heat absorber.

4. The refrigerant cycle device of claim 1, wherein
during a second heating and cool down mode in which the temperature adjustment target object is cooled at the temperature adjusting unit while the ventilation air is heated at the heating unit,
with the first on-off valve open, the refrigerant flowing out of the heating unit is guided to the bypass passage, and the cool down pressure reducing unit reduces the pressure of the refrigerant that passed through the bypass passage so that the temperature adjusting heat exchange unit functions as a heat absorber.

5. The refrigerant cycle device of claim 1, wherein the condenser is a water-refrigerant heat exchanger that exchanges heat between the refrigerant discharged from the compressor and a high temperature side heat medium, the heating unit is configured at a high temperature side heat medium circuit in which the water-refrigerant heat exchanger is connected to a heater core that exchanges heat between the ventilation air and the high temperature side heat medium heated at the water-refrigerant heat exchanger, and when an operation condition for switching from the sole heating mode that heats the ventilation air at the heating unit to a heating and warm up mode that heats the ventilation air at the heating unit along with warming up the temperature adjustment target object by the temperature adjusting unit is satisfied, the temperature of the high temperature side heat medium is increased in advance.

6. The refrigerant cycle device of claim 1, wherein
the temperature adjusting heat exchange unit is a chiller that exchanges heat between the refrigerant that flowed out of the cool down pressure reducing unit and a temperature adjustment side heat medium,
the temperature adjusting unit formed at a temperature adjustment side heat medium circuit in which the chiller is connected to a heat exchange unit that exchanges heat between the temperature adjustment target object and the temperature adjustment side heat medium which is temperature adjusted at the chiller, and
when an operation condition for switching from a sole warm up mode that warms up the temperature adjustment target object at the temperature adjusting unit to a heating and warm up mode that heats the ventilation air at the heating unit along with warming up the temperature adjustment target object by the temperature adjusting unit is satisfied, the temperature of the temperature adjustment side heat medium is increased in advance.

* * * * *